US006224045B1

(12) United States Patent
Muramatsu et al.

(10) Patent No.: US 6,224,045 B1
(45) Date of Patent: May 1, 2001

(54) VIBRATION DAMPING DEVICE HAVING FLUID CHAMBERS ON OPPOSITE SIDES OF PARTITION STRUCTURE HAVING MOVABLE RUBBER PLATE

(75) Inventors: Atsushi Muramatsu; Yoshihiko Hagino, both of Komaki; Hiroaki Tanahashi, Aichi-ken, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/223,305

(22) Filed: Dec. 30, 1998

(30) Foreign Application Priority Data

Jan. 14, 1998 (JP) .................................................. 10-005670
Feb. 27, 1998 (JP) .................................................. 10-047536

(51) Int. Cl.⁷ ...................................................... F16F 13/00
(52) U.S. Cl. ................ 267/140.13; 267/219; 267/140.11
(58) Field of Search .......................... 267/140.11, 140.13, 267/140.14, 140.15, 219; 248/562, 634, 636

(56) References Cited

U.S. PATENT DOCUMENTS

| | | | |
|---|---|---|---|
| 5,145,156 | 9/1992 | Muramatsu et al. | 267/140.14 |
| 5,170,998 * | 12/1992 | Muramatsu | 267/140.13 |
| 5,217,211 * | 6/1993 | Ide et al. | 267/140.13 |
| 5,246,212 * | 9/1993 | Funahashi et al. | 267/140.13 |
| 5,988,611 * | 11/1999 | Takashima et al. | 267/140.13 |
| 5,992,833 * | 11/1999 | Tanahashi | 267/140.14 |

FOREIGN PATENT DOCUMENTS 4-101833   9/1992   (JP) .
4-357344  12/1992   (JP) .

* cited by examiner

Primary Examiner—Robert Oberleitner
Assistant Examiner—Mariano Sy
(74) Attorney, Agent, or Firm—Burr & Brown

(57) ABSTRACT

Fluid-filled vibration damping device having a primary fluid chamber partially defined by an elastic body elastically connecting two spaced-apart mounting members and located on one of opposite sides of a partition structure having an orifice passage, an auxiliary fluid chamber partially defined by a flexible diaphragm and located on the other side of the partition structure, and a movable rubber plate partially defining the primary fluid chamber and held by the partition structure, wherein the partition structure comprises a support member including a cylindrical engaging portion, and at least one fluid-tightly fitted component superposed on the support member and each including a cylindrical engagement portion fitted in the engaging portion of the support member, and the movable rubber plate is bonded at its peripheral portion to the inner circumferential surface of the cylindrical engaging portion of the support member which is covered by a sealing rubber layer, and wherein the cylindrical engaging portion of the support member is radially inwardly drawn onto the cylindrical engagement portion of each fluid-tightly fitted component via the sealing rubber layer.

20 Claims, 11 Drawing Sheets

VIBRATION DAMPING DEVICE HAVING FLUID CHAMBERS ON OPPOSITE SIDES OF PARTITION STRUCTURE HAVING MOVABLE RUBBER PLATE

This application is based on Japanese Patent Applications No. 10-5670 filed Jan. 14, 1998 and No. 10-47536 filed Feb. 27, 1998, the contents of which are incorporated herein by reference.

BACKGROUND OF THE INVENTION

1. Field of the Invention

The present invention relates in general to a fluid-filled vibration damping device having fluid chambers filled with a non-compressible fluid and constructed to provide a vibration damping effect based on flows of the fluid between the fluid chambers. More particularly, the present invention is concerned with such a fluid-filled vibration damping device having a primary fluid chamber to which a vibrational load is applied, and an auxiliary fluid chamber whose volume is variable, and wherein a partition structure which separates the primary and auxiliary fluid chambers from each other includes a movable rubber plate which is elastically deformable so as to permit or control the fluid flows.

2. Discussion of the Related Art

There is known a fluid-filled vibration damping device such as an engine mount and a body mount for an automotive vehicle. As disclosed in JP-U-4-101833 and JP-A-4-357344, such a fluid-filled vibration damping device includes a first mounting member and a second mounting member which are spaced apart from each other and which are elastically connected to each other by an elastic body that partially defines a primary fluid chamber filled with a non-compressible fluid. The damping device further includes a partition structure supported by the second mounting member, and a flexible diaphragm which partially defines an auxiliary fluid chamber also filled with the non-compressible fluid. The primary and auxiliary fluid chambers are located on the opposite sides of the partition structure, respectively, and communicate with each other through an orifice passage formed through the partition structure. The vibration damping device further includes a movable rubber plate which is supported at its peripheral portion by the partition structure and which also partially defines the primary fluid chamber.

In such a known fluid-filled vibration damping device as described above, the partition structure separating the primary and auxiliary fluid chambers from each other is generally advantageously constituted by a combination of a plurality of components which are fixedly superposed on each other in the axial direction of the damping device in which the first and second mounting members are spaced apart from each other. This arrangement of the partition structure permits comparatively easy formation of the orifice passage having a sufficient length, resulting in an increased degree of freedom in tuning the vibration damping characteristics of the vibration damping device. The same arrangement also permits easy formation of a gas-tightly enclosed air chamber on one side of the movable rubber plate remote from the primary fluid chamber. The provision of the air chamber facilitates the adjustment of the spring characteristics of the movable rubber plate, and makes it possible to easily control the vibration damping characteristics of the device by periodically changing the pressure in the air chamber so as to oscillate the movable rubber plate.

Where the partition structure consists of two or more components superposed on each other as described above, it is important to construct the partition structure so as to assure a sufficient degree of fluid-tight sealing at the interfaces of the components, for preventing leakage flows of the fluid from the primary and auxiliary fluid chambers and the orifice passage and for securing high gas tightness of the air chamber, in order to permit the damping device to exhibit the desired vibration damping characteristics with high stability.

In view of the sealing requirement indicated above, it has been proposed to form all of the components of the partition structure of a thermoplastic synthetic resin and fusion-weld these resin components together after they are superposed on each other. Alternatively, the components are superposed on each other in the axial direction of the damping device such that the movable rubber plate is gripped at its peripheral portion by the adjacent components, and such that the components are pressed against each other by the second mounting member.

However, the partition structure consisting of the mutually fusion-welded synthetic resin components is comparatively difficult to manufacture and is accordingly expensive. This partition structure has another drawback, that is, difficulty to assure a sufficiently high degree of reliability of sealing at the interfaces of the components.

In the partition structure wherein the superposed components are pressed against each other so as to grip the peripheral portion of the movable rubber plate, the pressing force directly acts on the peripheral portion of the movable rubber plate, causing an adverse effect on the spring characteristics of the movable rubber plate, or a variation in the spring characteristics, resulting in deterioration of the vibration damping characteristics of the damping device and reduction in the durability of the movable rubber plate. Further, the components of the partition structure of this type are subject to bending stresses due to the pressing force applied by the second mounting member, and are required to have comparatively large wall thickness and high rigidity in order to assure sufficient mechanical strength and deformation resistance and sufficient durability.

SUMMARY OF THE INVENTION

It is an object of the present invention to provide a fluid-filled vibration damping device having an improved partition structure which is simple in construction and which provides a sufficient degree of fluid-tight sealing at the interfaces of its mutually superposed components and has excellent durability.

It is another object of this invention to provide a fluid-filled vibration damping device having a partition structure which provides a sufficient degree of fluid-tight sealing at the interfaces of its mutually superposed components, while minimizing an adverse effect of the sealing on the spring characteristics of a movable rubber plate movably supported by the partition structure.

The above objects may be achieved according to the principle of the present invention, which provides a fluid-filled vibration damping device including (a) a first mounting member and a second mounting member which are spaced-apart from each other, (b) an elastic body elastically connecting the first and second mounting members and partially defining a primary fluid chamber filled with a non-compressible fluid, (c) a partition structure supported by the second mounting member and partially defining an orifice passage, (d) a flexible diaphragm partially defining an auxiliary fluid chamber which is filled with the non-compressible fluid, held in fluid communication with the primary fluid chamber through the orifice passage, and located on one of opposite sides of the partition structure which is remote from the primary fluid chamber, and (e) a movable rubber plate partially defining the primary fluid chamber and held at a peripheral portion thereof by the partition structure, wherein an improvement comprises: the partition structure comprising a support member which includes a cylindrical engaging portion, and at least one fluid-tightly fitted component which is superposed on the support member in an axial direction of the cylindrical engaging portion and which includes a cylindrical engagement portion fitted in the cylindrical engaging portion of the support member; the movable rubber plate being movably bonded at the peripheral portion thereof to an inner circumferential surface of the cylindrical engaging portion of the support member, which surface is covered by a sealing rubber layer; and the cylindrical engaging portion of the support member being radially inwardly drawn onto the cylindrical engagement portion of each of the at least one fluid-tightly fitted component via the sealing rubber layer, so as to establish fluid-tight sealing between the engaging portions of the support member and the each fluid-tightly fitted component.

In the fluid-filled vibration damping device of the present invention constructed as described above, the cylindrical engaging portion of the support member of the partition structure is radially inwardly drawn onto the outer circumferential surface of the cylindrical engagement portion of each of the at least one fluid-tightly fitted component, so as to establish the fluid-tight sealing between the engaging portions of the support member and each fluid-tightly fitted component with the sealing rubber layer being compressed therebetween. For improved efficiency and reduced cost of manufacture of the support member, it is preferable to form the support member by a pressing operation on a suitable blank. The support member preferably includes a flange portion extending radially outwardly from an axial end thereof, so that the support member is supported at its flange portion by the second mounting member.

In the partition structure of the vibration damping device of the present invention, the fluid-tight sealing between the engaging portions of the support member and the at least one fluid-tightly fitted component can be established without requiring a time-consuming fusion-welding operation, with a simpler construction than in the conventional partition structure using fusion-welded components. Further, the partition structure of the present vibration damping device is arranged such that the sealing rubber layer is compressed in the radial direction along the circumference of the support member, so as to provide a higher degree of fluid tightness between the support member and each fluid-tightly fitted component, than the conventional partition structure wherein the fluid tight sealing is established by forcing the components against each other in the direction in which the components are superposed on each other. Thus, the present partition structure has a longer sealing life and a higher degree of durability than the conventional partition structures. In addition, the movable rubber plate is protected from a direct exposure to the force generated by the radially inward drawing of the cylindrical engaging portion of the support member onto the cylindrical engagement portion of the fluid-tightly fitted component. Accordingly, the present partition structure has improved fluid tight sealing at the interface of the support member and each fluid-tightly fitted component, while assuring the desired spring characteristics of the movable rubber plate and the desired vibration damping characteristics of the vibration damping device.

The present fluid-filled vibration damping device may use either a single primary fluid chamber, or alternatively a plurality of primary fluid chambers communicating with each other so that the damping device provides a damping effect based on flows of the fluid from one of the primary fluid chambers to another. The latter arrangement may be attained according to one preferred form of this invention, wherein the above-indicated at least one fluid-tightly fitted component includes a first fluid-tightly fitted component which is superposed on the support member, such that the first fluid-tightly fitted component is disposed on the same side of the support member as the primary fluid chamber, and such that the first fluid-tightly fitted component divides the primary fluid chamber into a first primary fluid chamber which is partially defined by the elastic body and which is located on one of opposite sides of the first fluid-tightly fitted component, and a second primary fluid chamber which is partially defined by the movable rubber plate and which is located on the other side of the first fluid-tightly fitted component, and wherein the first fluid-tightly fitted component and the support member have surfaces cooperating to define a connecting channel extending in a circumferential direction of the cylindrical engaging and engagement portions, the first and second primary fluid chambers communicating with each other through the connecting channel.

In the fluid-filled vibration damping device according to the above-indicated preferred form of this invention constructed as described above, the first fluid-tightly fitted component is superposed on the support member so as to establish the required degree of fluid tight sealing therebetween, and so as to form the first and second primary fluid chambers and the connecting channel for fluid communication between these two primary fluid chambers. This vibration damping device provides a vibration damping effect on the basis of flows of the fluid between the first and second primary fluid chambers through the connecting channel. Although the first fluid-tightly fitted component may be formed of a synthetic resin material, it is preferably formed of a metallic material by pressing, for improved efficiency and reduced cost of manufacture of the first fluid-tightly fitted component. In one advantageous arrangement of the above-indicated preferred form of this invention, the first fluid-tightly fitted component includes a central cup-shaped portion and an annular flat peripheral portion which extends radially outwardly from an open end of the cup-shaped portion. In this arrangement, the first fluid-tightly fitted component is superposed at its annular flat peripheral portion on an annular flat peripheral portion of the support member such that the cup-shaped portion of the first fluid-tightly fitted component is positioned within a radially inner cylindrical portion of the support member. Described more precisely, the bottom part of the cup-shaped portion of the first fluid-tightly fitted component functions as the above-indicated cylindrical engagement portion onto which the cylindrical engaging portion of the support member is radially inwardly drawn, while the outer circumferential surface of the cup-shaped portion of the first fluid-tightly fitted component cooperates with the inner circumferential surface of the radially inner cylindrical portion of the support member to define the connecting channel extending in the circumferential direction of the partition structure.

In the fluid-filled vibration damping device of the present invention, the primary fluid chamber and the auxiliary fluid chamber may be formed on the opposite sides of the movable rubber plate such that the pressures of the fluid in these primary and auxiliary fluid chambers act on the respective opposite surfaces of the movable rubber plate.

However, the vibration damping device may be constructed, according to another preferred form of this invention, such that the at least one fluid-tightly fitted component includes a second fluid-tightly fitted component which is superposed on the support member, such that the second fluid-tightly fitted component is disposed on the same side of the support member as the auxiliary fluid chamber, and such that the second fluid-tightly fitted component cooperates with the movable rubber plate to define an air chamber which permits elastic displacement of the movable rubber plate.

In the vibration damping device according to the above-indicated preferred form of this invention, the second fluid-tightly fitted component is superposed on the support member so as to establish the required degree of fluid tight sealing therebetween, and so as to form the air chamber located on one side of the movable rubber plate which is remote from the primary fluid chamber. The thus formed air chamber has a sufficient degree of fluid tightness with respect to the primary and auxiliary fluid chambers. By suitably regulating the air pressure in the air chamber, the spring characteristics of the movable rubber plate and the vibration damping characteristics of the damping device may be controlled as needed. The second fluid-tightly fitted component is desirably arranged such that its radially outer portion partially defines the orifice passage extending in the circumferential direction for fluid communication between the primary and auxiliary fluid chambers.

The second fluid-tightly fitted component may be formed of a metallic material by pressing or die-casting, or molded of a synthetic resin material. In the latter case, the second fluid-tightly fitted component may have an air passage communicating with an external air pressure source. In this case, the air passage can be easily formed through the second fluid-tightly fitted component formed of the synthetic resin material. The spring characteristics of the movable rubber plate and the vibration damping characteristics of the damping device may be changed, by changing the pressure in the air chamber through the air passage. Further, the movable rubber plate may be positively oscillated by periodically changing the air pressure in the air chamber through the air passage, so that the oscillating movement of the movable rubber plate acts to offset or absorb the periodic fluid pressure change in the primary fluid chamber due to elastic deformation of the elastic body which is caused by an input vibration. In this instance, the vibration damping device provides an active vibration damping effect based on the oscillation of the movable rubber plate.

The partition structure may include both of the above-indicated first and second fluid-tightly fitted components which are superposed on the support member such that the support member is interposed between these two fluid-tightly fitted components and such that the axially opposite end portions of the support member are radially inwardly drawn onto the respective cylindrical engagement portions of the two fluid-tightly fitted components via the sealing rubber layer. This arrangement permits simple construction of the partition structure, while assuring excellent fluid tightness of the primary and auxiliary fluid chambers, and the air chamber if provided.

The orifice passage provided in the present vibration damping device may be formed with a desired configuration. For instance, the orifice passage may be provided according to a further preferred form of this invention, wherein the second mounting member includes a cylindrical portion in which the partition structure is accommodated, the support member and the at least one fluid-tightly fitted component cooperating with the cylindrical portion of the second mounting member to define the orifice passage such that the orifice passage extends in a circumferential direction of the cylindrical portion of the second mounting member and is at least partially defined by an outer circumferential surface of the support member. In this form of the invention, the orifice passage can be relatively easily formed, with a high degree of fluid tightness, by effectively utilizing the space within the cylindrical portion of the second mounting member. In addition, this arrangement provides a comparatively high degree of freedom in tuning the orifice passage, in particular, in determining the length of the orifice passage.

The support member and the at least one fluid-tightly fitted component of the partition structure may have radially outer portions which cooperate to define the orifice passage whose circumferential length is equal to, or smaller or larger than a value corresponding to the entire circumference of the partition structure. Where the primary fluid chamber is divided by the first fluid-tightly fitted component into the first and second primary fluid chambers, the first primary fluid chamber may be communicated with the auxiliary fluid chamber through the orifice passage. This orifice passage may be independent of the connecting channel for fluid communication between the first and second primary fluid chambers. Alternatively, the second primary fluid chamber may be communicated with the auxiliary fluid chamber through the orifice passage, which may be communicated with the connecting channel through the second primary fluid chamber, so that the orifice passage, second primary fluid chamber and connecting channel cooperate to define a fluid passage for fluid communication between the primary fluid chamber and the auxiliary fluid chamber.

According to a still further preferred form of the present invention, the above-indicated at least one fluid-tightly fitted component consists of a single fluid-tightly fitted component, and the support member is a cylindrical member having axially opposite end portions one of which serves as the cylindrical engaging portion of the support member and which is radially inwardly drawn onto the cylindrical engagement portion of the single fluid-tightly fitted component, the support member having a constant outside diameter not larger than that of the cylindrical engagement portion of the single fluid-tightly fitted component, and wherein the partition structure further comprises a press-fitted component which includes a substantially annular engaging portion, the above-indicated press-fitted component being superposed on the support member such that the support member is interposed between the press-fitted component and the single fluid-tightly fitted component and such that the substantially annular engaging portion is press-fitted on an outer circumferential surface of the other of the axially opposite end portions of the support member.

In the above preferred form of the invention, the fluid-tightly fitted component may be assembled with the support member before the press-fitted component is assembled with the support member. Accordingly, the end portion of the cylindrical support member which corresponds to the single fluid-tightly fitted component can be radially inwardly drawn onto the cylindrical engagement portion of the single fluid-tightly fitted component, without an interference of a drawing device (such as drawing dies disposed around the cylindrical support member) with the press-fitted component which is subsequently press-fitted on the other end portion of the cylindrical support member. Therefore, the efficiency of assembling of the single fluid-tightly fitted component and the support member is accordingly improved.

The construction and material of the press-fitted component are not particularly limited. For instance, this press-fitted component may be formed by a pressing operation on a metallic circular plate, so as to have the substantially annular engaging portion which is to be press-fitted on the cylindrical support member. Alternatively, the press-fitted component may be formed by superposing a plurality of metallic plates on each other so as to form the substantially annular engaging portion. It is noted that the substantially annular engaging portion need not be a completely annular engaging portion, provided it has a sufficient strength required for the press-fitting on the support member. For instance, the substantially annular engaging portion may be a part-circumferential engaging portion formed along a substantive portion of the circumference of the partition structure, or may consist of a plurality of engaging parts which are arranged in the circumferential direction of the partition structure.

The press-fitted component may include an annular peripheral portion at which this press-fitted component is fixed to the second mounting member. For instance, the annular peripheral portion may be an annular peripheral flat portion which is calked with respect to the second mounting member or gripped by and between a shoulder portion of the second mounting member and a suitable member such as a metallic sleeve bonded to the elastic body.

In one advantageous arrangement of the above-indicated preferred form of the invention wherein the partition structure includes the press-fitted component as well as the single fluid-tightly fitted component, the press-fitted component includes a central portion which is spaced apart from the movable rubber plate in an axial direction of the support member, the press-fitted component being disposed on the same side of the support member as the primary fluid chamber, such that the press-fitted component divides the primary fluid chamber into a first primary fluid chamber partially defined by the elastic body and which is located on one of opposite sides of the central portion, and a second primary fluid chamber which is partially defined by the movable rubber plate and which is located on the other side of the central portion, the substantially annular engaging portion of the press-fitted component at least partially defining a connecting channel extending in a circumferential direction of the support member, the first and second primary fluid chambers communication with each other through the connecting channel.

In the fluid-filled vibration damping device according to the above advantageous arrangement, the press-fitted component is effectively utilized to define the first and second primary fluid chambers and the connecting channel. The damping device provides a vibration damping effect based on flows of the fluid between the two primary fluid chambers through the connecting channel. The press-fitted component preferably consists of two metal plates which are superposed on each other. One of these two metal plates is formed by pressing so as to form a radially outer substantially annular raised portion which is raised in the axial direction so as to provide the above-indicated substantially annular engaging portion. This substantially annular raised portion has a substantially annular groove which is open on one of the opposite sides of the above-indicated one metal plate. This substantially annular raised portion is closed by the other metal plate which is generally flat, whereby the substantially annular connecting channel is formed. The orifice passage indicated above may be communicated with the second primary fluid chamber and the auxiliary fluid chamber. In this case, the connecting channel may cooperate with the orifice passage and the second primary fluid chamber to define a fluid passage for fluid communication between the first primary fluid chamber and the auxiliary fluid chamber.

In another advantageous arrangement of the above-indicated preferred form of the invention wherein the partition structure includes the press-fitted component as well as the single fluid-tightly fitted component, the fluid-tightly fitted component includes a body portion including the cylindrical engagement portion fitted in the one of axially opposite end portions of the support member, the body portion having a diameter larger than the constant outside diameter of the support member, the body portion further including a peripheral portion which cooperates with the outer circumferential surface of the support member and the substantially annular engagement portion of the press-fitted component to define a groove extending in a circumferential direction of the support member, and wherein the second mounting member includes a cylindrical portion in which the partition structure is accommodated and which closes the groove to at least partially define the orifice passage. In this fluid-filled vibration damping device, the orifice passage may be advantageously formed by effectively utilizing the space within the cylindrical portion of the second mounting member, and without using any member other than the support member, and the fluid-tightly fitted component and press-fitted component. In this arrangement, the orifice passage may be easily formed with a sufficient length. Preferably, the single fluid-tightly fitted component and press-fitted component are arranged to define a fluid passage which communicates with the above-indicated groove and cooperates with the groove to define the orifice passage. This arrangement provides a higher degree of freedom in determining the length of the orifice passage.

BRIEF DESCRIPTION OF THE DRAWINGS

The above and optional objects, features, advantages and technical and industrial significance of the present invention will be better understood by reading the following detailed description of present preferred embodiments or modes of the invention, when considered in connection with the accompanying drawings, in which.

DETAILED DESCRIPTION OF THE PREFERRED EMBODIMENTS

Figure 1:
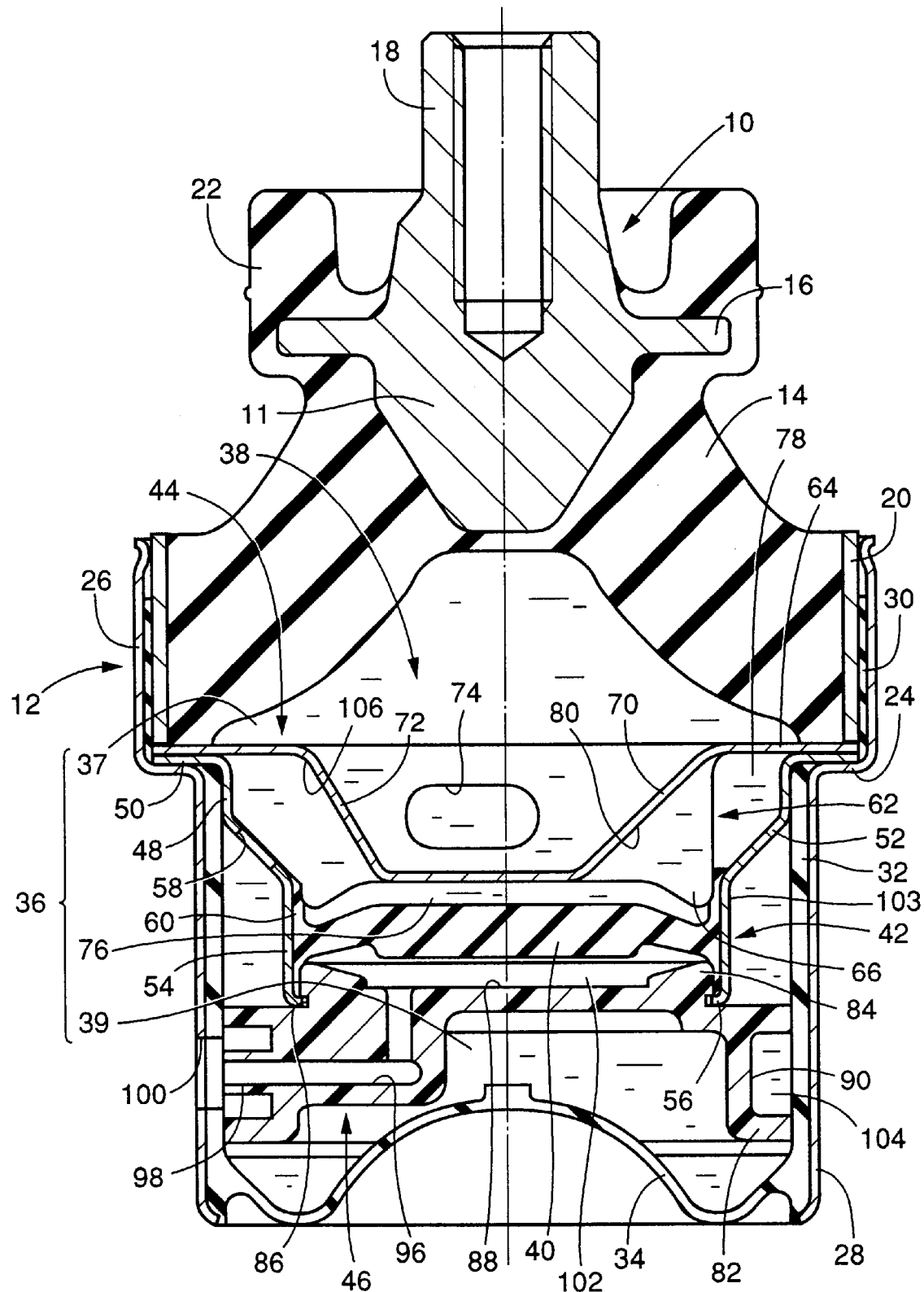
FIG. 1 is an elevational view in axial cross section of a fluid-filled vibration damping device in the form of an automotive vehicle engine mount constructed according to one embodiment of this invention, the cross sectional view being taken along line 1—1 of FIG. 4.

Referring first to FIG. 1, the engine mount for an automotive vehicle is shown as one embodiment of the fluid-filled vibration damping device of the present invention. This engine mount includes a first mounting member 10 and a second mounting member 12, which are generally cylindrical members formed of suitable metallic materials. These first and second mounting members 10, 12 are spaced apart from each other in their axial direction, that is, in the axial direction of the engine mount, and are elastically connected to each other by an elastic body 14 interposed therebetween. The first mounting member 10 is attached to the power unit of the vehicle, while the second mounting member 12 is attached to the body of the vehicle, so that the power unit is supported by the vehicle body in a vibration damping fashion.

Described in detail, the first mounting member 10 includes an inverted frustoconical body portion 11, an annular stopper portion 16 in the form of an outward flange, and an internally threaded portion 18. The annular stopper portion 16 is formed integrally with the body portion 11 such that the annular stopper portion 16 extends radially outwardly from the periphery of the the large-diameter end of the body portion 11. The internally threaded portion 18 is also formed integrally with the body portion 11, such that the internally threaded portion 18 extends upwards from the large-diameter end face of the body portion 11. The internally threaded portion 18 has a tapped hole for engagement with a fixing screw used for attaching the first mounting member 10 to the power unit of the vehicle.

The elastic body 14 is bonded to the inverted frustoconical body portion 11 of the first mounting member 10, in the process of vulcanization of a rubber material to form the elastic body 14. The elastic body 14 is a generally frustoconical member having a relatively large diameter and an inverted-cup-shaped central recess open in the face of the large-diameter end. The elastic body 14 is formed such that the inverted frustoconical body portion 11 of the first mounting member 10 is embedded in the small-diameter end portion of the elastic body. To the outer circumferential surface of the large-diameter end portion of the elastic body 14, there is bonded a metallic sleeve 20 in the above-indicated vulcanization process. The annular stopper portion 16 is covered by an annular rubber buffer 22, which extends upwards from the stopper portion 16, for abutting contact with a suitable member fixed to the second mounting member 12, so as to limit a maximum distance of relative movement between the first and second mounting members 10, 12 away from each other in the axial direction of the engine mount.

The second mounting member 12 is a generally cylindrical member having a relatively large diameter, which consists of an intermediate shoulder portion 24, an upper large-diameter cylindrical portion 26 located on one of opposite sides of the shoulder portion 24, and a lower small-diameter cylindrical portion 28 located on the other side of the shoulder portion 24. This second mounting member 12 is attached to the vehicle body through a suitable mounting bracket.

The large-diameter and small-diameter cylindrical portions 26, 28 have respective thin sealing rubber layers 30, 32 formed on their inner circumferential surfaces. The sealing rubber layer 32 of the small-diameter cylindrical portion 28 is formed integrally with a flexible diaphragm 34 which is a relatively thin rubber layer. The flexible diaphragm 34 is bonded at its periphery to the lower end portion of the sealing rubber layer 32, in the process of vulcanization of a rubber material to form the flexible diaphragm 34 and the sealing rubber layer 32. Thus, the lower open end of the lower small-diameter cylindrical portion 28 is fluid-tightly closed.

The second mounting member 12 is fixed to the large-diameter end portion of the elastic body 14, with its upper large-diameter cylindrical portion 26 being press-fitted on the metallic sleeve 20 by a suitable method, for example, by a drawing operation to press the cylindrical portion 26 onto the metallic sleeve 20 in the radially inward direction. In the presence of the sealing rubber layer 30 which is compressed between the cylindrical portion 26 and the metallic sleeve 20, the second mounting member 12 is fluid-tightly fixed to the elastic body 14. In this arrangement, the upper open end of the second mounting member 12 is fluid-tightly closed by the elastic body 14. Thus, the second mounting member 12, elastic body 14 and flexible diaphragm 34 cooperate with each other to define a fluid-tightly enclosed fluid chamber 36 filled with a non-compressible fluid.

The non-compressible fluid filling the fluid chamber 36 may be desirably selected from among water, alkylene glycol, polyalkylene glycol and silicone oil. For the engine mount to exhibit a sufficiently high vibration damping effect based on flows of the non-compressible fluid through the fluid chamber 36, it is desirable to use a non-compressible fluid whose viscosity is not higher than 0.1 Pa·s.

The present engine mount further includes a partition structure 38 disposed or accommodated within an axially intermediate part of the second mounting member 12, so that the fluid chamber 36 is fluid-tightly separated by the partition structure 38 into two sections, namely, a primary fluid chamber 37 located on the upper side of the partition structure 38, and an auxiliary fluid chamber in the form of an equilibrium fluid chamber 39 located on the lower side of the partition structure 38. The first primary fluid chamber 37 is defined by the elastic body 14, second mounting member 12 and partition structure 38, while the equilibrium fluid chamber 39 is defined by the flexible diaphragm 34, second mounting member 12 and partition structure 38. Upon application of a vibrational load to the engine mount, the pressure in the first primary fluid chamber 37 periodically changes due to elastic deformation of the elastic body 14. The flexible diaphragm 34 is elastically deformed or displaced so as to permit a change in the volume of the equilibrium fluid chamber 39.

Figure 2:
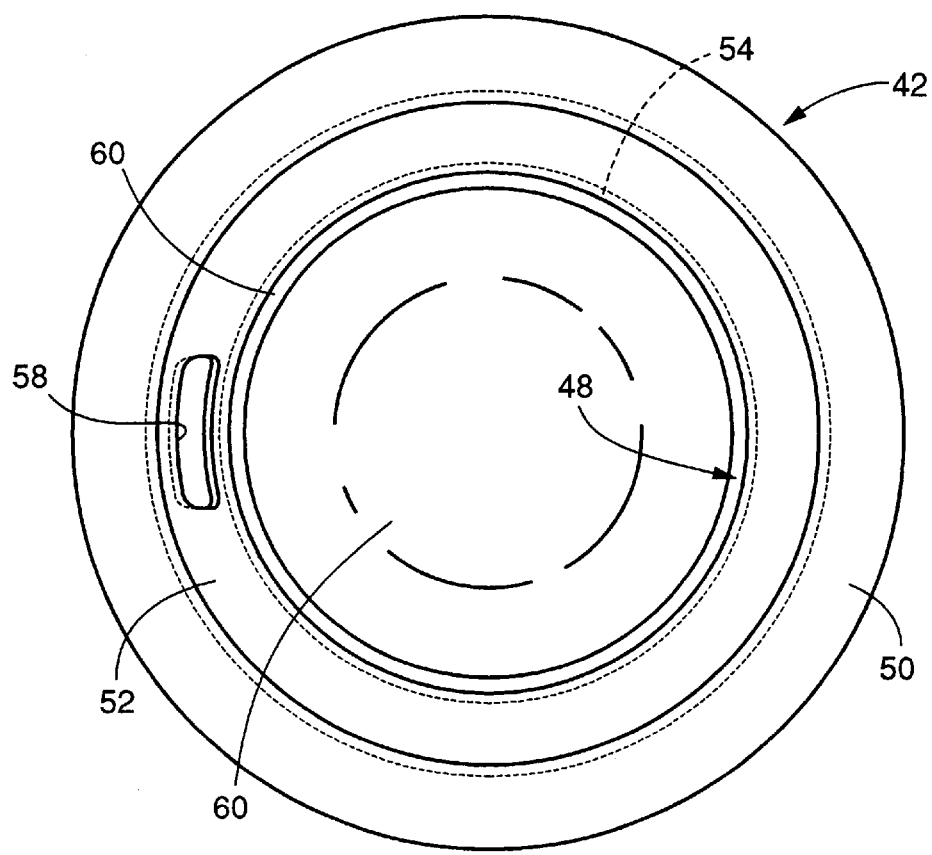
FIG. 2 is a plan view of a support member of a partition structure provided in the engine mount of FIG. 1.
Figure 3:
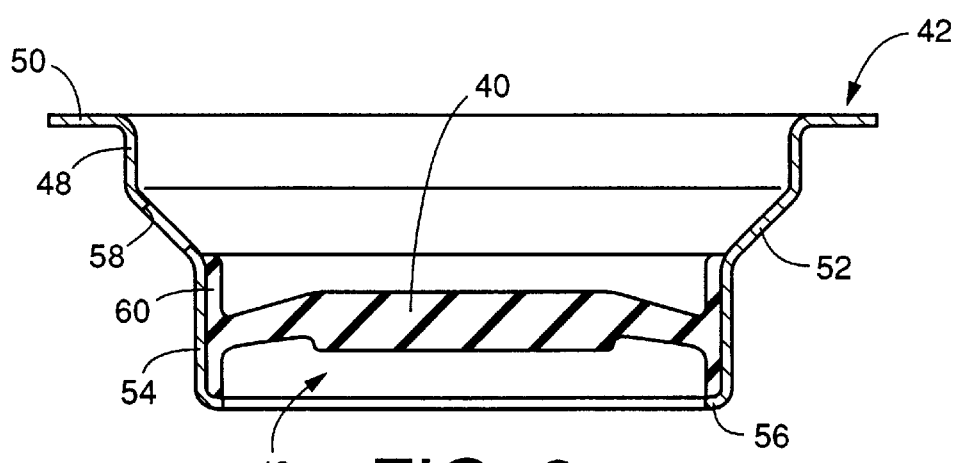
FIG. 3 is an elevational view in axial cross section of an intermediate assembly consisting of the support member and a movable rubber plate bonded to the support member.
Figure 4:
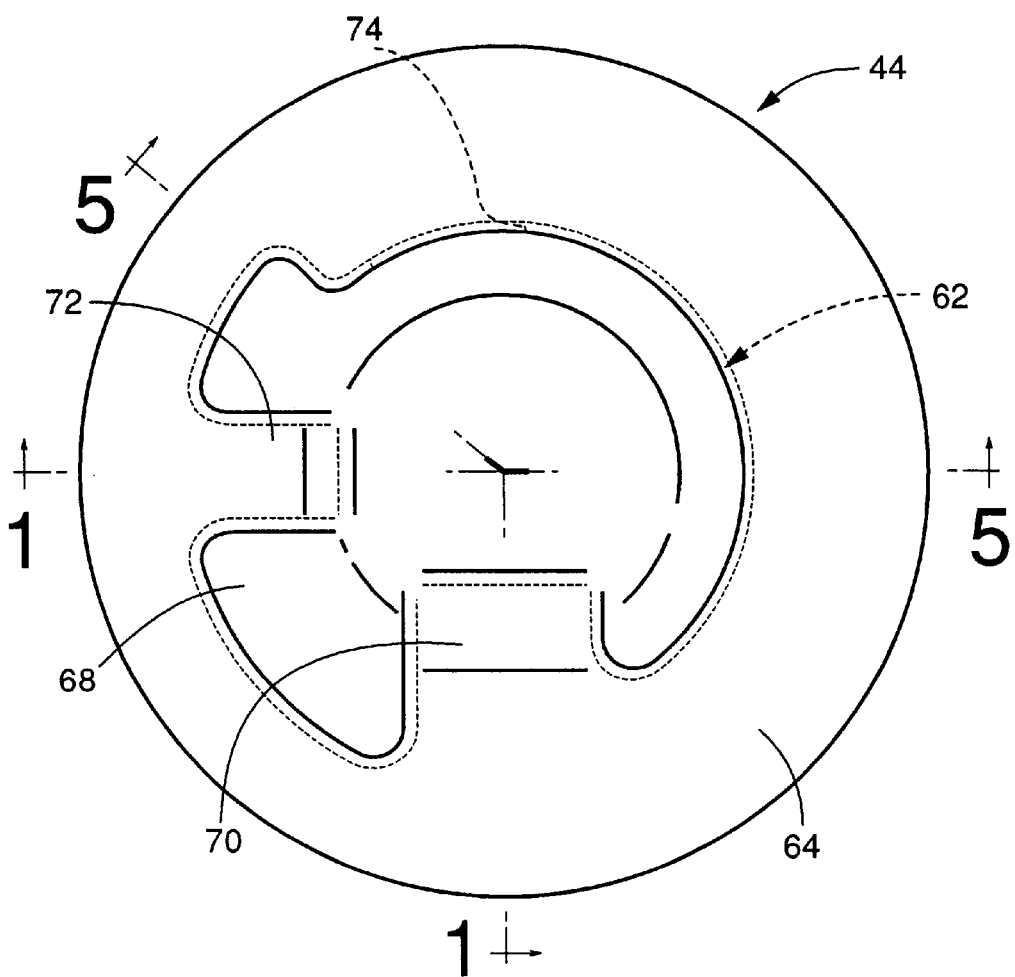
FIG. 4 is a plan view of an upper member of the partition structure of the engine mount of FIG. 1.
Figure 5:
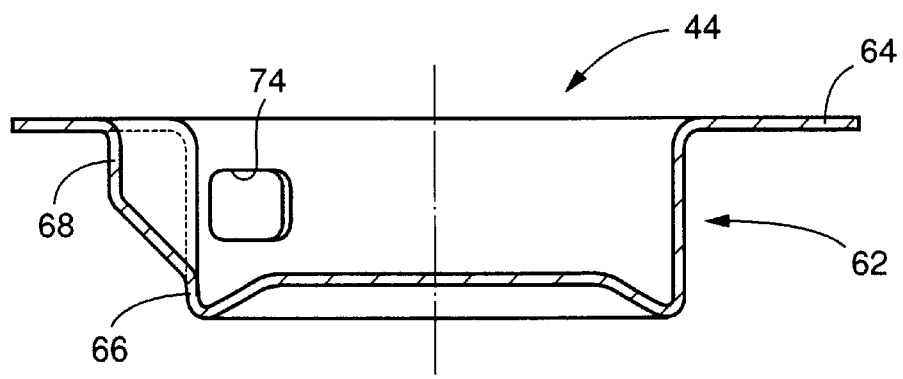
FIG. 5 is a cross sectional view taken along line 5—5 of FIG. 4.
Figure 6:
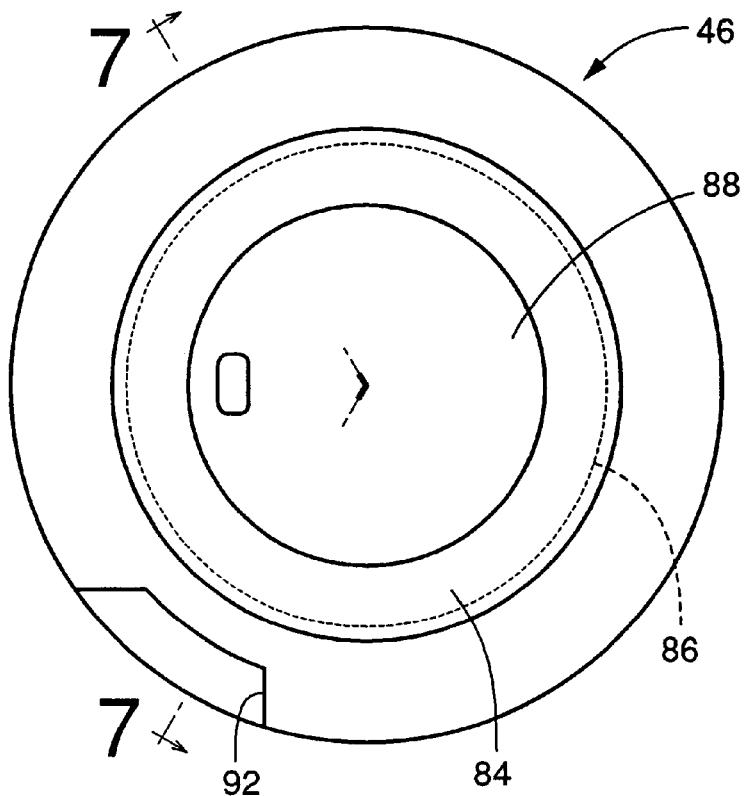
FIG. 6 is a plan view of a lower member of the partition structure of the engine mount of FIG. 1.
Figure 7:
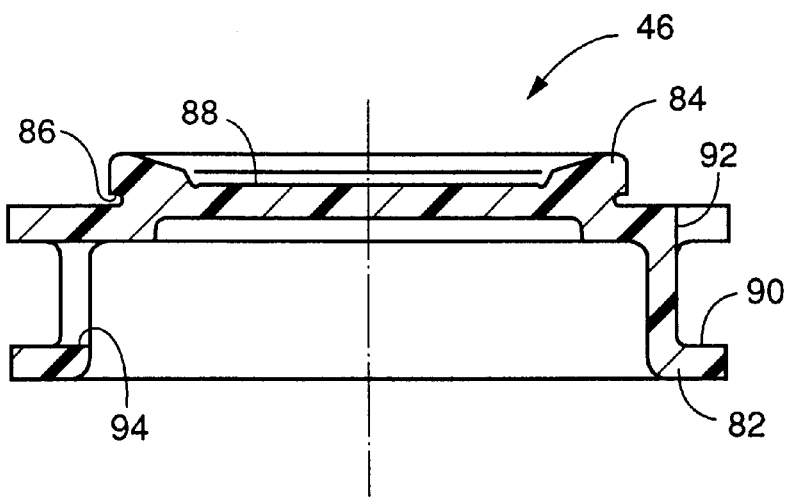
FIG. 7 is a cross sectional view taken along line 7—7 of FIG. 6.
Figure 8:
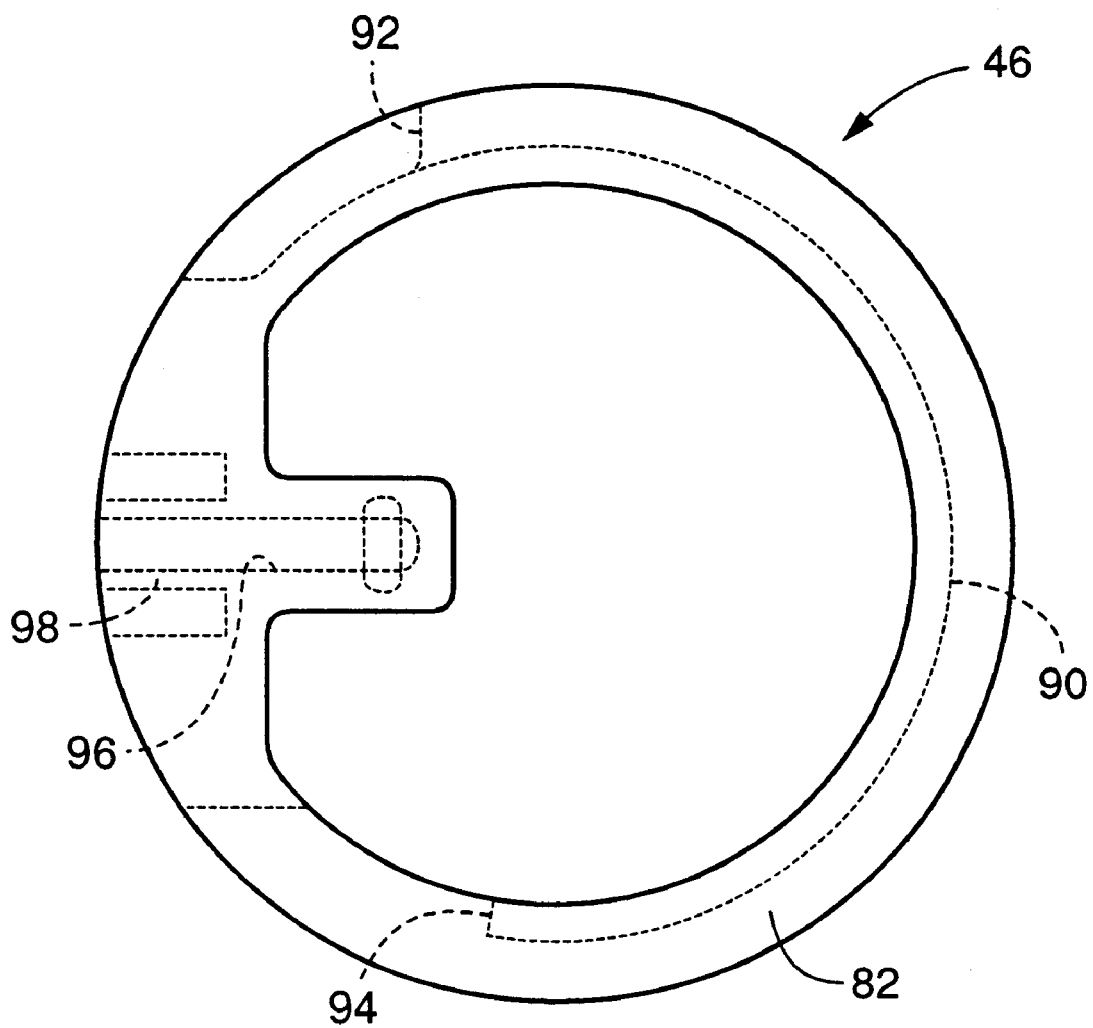
FIG. 8 is a bottom plan view of the lower member of FIG. 6.

The partition structure 38 is a generally circular block consisting of a support member 42 shown in FIGS. 2 and 3, a first or upper fluid-tightly fitted component in the form of an upper member 44 shown in FIGS. 4 and 5, and a second or lower fluid-tightly fitted component in the form of a lower member 46 shown in FIGS. 6–8. The support member 42 and a movable rubber plate 40 movably bonded to the support member 42 cooperate to constitute an intermediate assembly 43 shown in FIG. 3. The intermediate assembly 43 and the upper and lower members 44, 46 are mutually fixedly superposed on each other in the axial direction such that the upper and lower members 44, 46 are disposed on the opposite sides of the intermediate assembly 43.

The support member 42 of the intermediate assembly 43 of the partition structure 38 is a metallic member including a large-diameter cylindrical portion 48, and an annular flange portion 50 which extends radially outwardly from the upper end of the cylindrical portion 48, as shown in FIG. 3. The support member 42 is fixedly supported by the second mounting member 12 such that the flange portion 50 is gripped by and between the shoulder portion 24 and the metallic sleeve 20, as shown in FIG. 1. The support member 42 further includes a tapered portion 52 extending from the lower end of the large-diameter cylindrical portion 48 in the axial direction, and a small-diameter cylindrical engaging portion 54 extending from the small-diameter end of the tapered portion 52 in the axial direction, so that the large-diameter cylindrical portion 48 and the small-diameter cylindrical engaging portion 54 are connected by the intermediate tapered portion 52. The engaging portion 54 has an integrally formed annular inwardly bent edge 56 at its lower open end. The bent edge 56 radially inwardly extends from the lower open end of the engaging portion 54 over a relatively small distance. The tapered portion 52 has a communication hole 58 formed therethrough in the radial direction, at a predetermined circumferential position, as most clearly shown in FIG. 2. The thus constructed support member 42 may be formed by punching, deep drawing, ironing or other press forming operations performed on a metal plate.

The movable rubber plate 40 having a generally circular disc shape is bonded at its periphery to the inner circumferential surface of the small-diameter cylindrical engaging portion 54 of the support member 42, in the process of vulcanization of a rubber material to form the movable rubber plate 40. In the intermediate assembly 43, the movable rubber plate 40 is normally positioned in an axially intermediate position of the engaging portion 54 of the support member 42, as shown in FIG. 3, so as to extend in the radial direction. The movable rubber plate 40 has an elasticity and is displaceable in the axial direction, with elastic deformation thereof. In this embodiment, the movable rubber plate 40 generally takes the form of an inverted shallow dish having a slightly tapered radially outer portion whose thickness is suitably determined to be smaller than that of the central portion, so that the movable rubber plate 40 has desired spring characteristics.

The inner circumferential surface of the engaging portion 54 is substantially entirely covered by a thin sealing rubber layer 60, which is formed integrally with the movable rubber plate 40 such that the sealing rubber layer 60 extends in the opposite axial directions from the periphery of the movable rubber plate 40, as shown in FIG. 3. Thus, the interior space of the small-diameter cylindrical engaging portion 54 of the support member 42 of the intermediate assembly 43 is fluid-tightly divided into two axial sections by the movable rubber plate 40 located at the axially intermediate position.

The upper member 44 of the partition structure 38 is a metallic member including a thin-walled generally cup-shaped portion 62, and an annular flange portion 64 which is formed integrally with the cup-shaped portion 62 so as to extend radially outwardly from the open end of the cup-shaped portion 62, as shown in FIGS. 4 and 5. The cup-shaped portion 62 has a cylindrical section whose outside diameter is slightly smaller than the inside diameter of the engaging portion 54 of the support member 42, and is disposed in the large-diameter cylindrical portion 48 of the support member 42. The flange portion 64 is held in contact with the upper surface of the flange portion 50 of the support member 42 and is gripped by and between the shoulder portion 24 of the second mounting member 12 and the metallic sleeve 20, together with the flange portion 50. Thus, the upper member 44 is fixed to the second mounting member 12. The upper member 44 may be formed by a deep drawing operation or other press forming operation performed on a metal plate.

The cup-shaped portion 62 has a bottom wall whose central part is raised so as to form an annular recess at the radially outer part. In other words, the depth or axial dimension of the cup-shaped portion 62 is larger at its radially outer part than at its central part, so that the cup-shaped portion 62 has an annular engaging part 66 whose outer circumferential surface has an outside diameter slightly smaller than the inside diameter of the small-diameter cylindrical engaging portion 54 of the support member 42. The cup-shaped portion 62 has a blocking part 68 formed along about one third of its entire circumference, as shown in FIG. 4. The blocking part 68 has a larger diameter than the other circumferential portion of the cup-shaped portion 62. The cup-shaped portion 62 further has a first aperture portion 70 adjacent to one of the circumferential opposite ends of the blocking part 68, and a second aperture portion 72 located at a circumferentially intermediate part of the blocking part 68, as also shown in FIG. 4. These first and second aperture portions 70 and 72 have a smaller diameter than the diameter of the other portions of the cup-shaped portion 62, and have respective communication passages 80, 106 (which will be described) for fluid flows between the inside and the outside of the cylindrical wall of the cup-shaped portion 62. The cup-shaped portion 62 also has a communication hole 74 formed through its cylindrical wall in the radial direction, at a circumferential position diametrically opposite to the first aperture portion 70.

The upper member 44 is superposed on the intermediate assembly 43 such that the engaging part 66 of the cup-shaped portion 62 of the upper member 44 is fitted in the axially upper end portion of the engaging portion 54 of the support member 42, via the sealing rubber layer 60 interposed therebetween, as shown in FIG. 1, and such that the large-diameter blocking part 68 is held in contact with the inner circumferential surface of the large-diameter cylindrical portion 48 of the support member 42. In this arrangement, the upper open end of the engaging portion 54 of the support member 42 is closed by the bottom wall of the cup-shaped portion 62 of the upper member 44. As a result, a second primary fluid chamber 76 is defined by the bottom wall of the cup-shaped portion 62, the movable rubber plate 40 and the sealing rubber layer 60 (engaging portion 54 of the support member 42). The second primary fluid chamber 76 is also filled with the non-compressible fluid. Further, the large-diameter cylindrical portion 48 of the support member 42 cooperates with the circumferential wall of the cup-shaped portion 62 of the upper member 44 to define a connecting channel 78 extending in the circumferential direction of the upper member 44. The opposite circumferential ends of the connecting channel 78 are defined by the blocking part 68, so that the connecting channel 78 has a circumferential length corresponding to about two-thirds of the entire circumference of the cup-shaped portion 62. The connecting channel 78 communicates at one of its opposite ends with the first primary fluid chamber 37 through the communication hole 74, and at the other end with the second primary fluid chamber 76 through a first communication passage 80 formed through the first aperture portion 70 of the upper member 44. In this arrangement, the connecting channel 78 permits flows of the non-compressible fluid between the first and second primary fluid chambers 37, 76 based on elastic deformation of the elastic body 14 and elastic deformation or displacement of the movable rubber plate 40.

It will be understood that the first and second primary fluid chambers 37, 76 constitute a primary chamber portion of the fluid chamber 36.

The lower member 46 of the partition structure 38 generally takes the form of a circular disc with an integrally formed orifice-defining cylindrical portion 82 which extends downwards from the peripheral portion of the disc, as shown in FIG. 7. This cylindrical portion 82 has a relatively large cylindrical wall thickness. The circular disc of the lower member 46 has an integrally formed circular central engagement protrusion 84 which is raised upwards in the direction away from the orifice-defining cylindrical portion 82, as also shown in FIG. 7. The central engagement protrusion 84 has an annular engaging groove 86 formed in its outer circumferential surface, and a central recess 88 open in its upper surface and having a relatively large diameter, as shown in FIGS. 6 and 7. The orifice-defining cylindrical portion 82 has a part-circumferential groove 90 formed in the outer circumferential surface, along about two-thirds of its entire circumference, as shown in FIG. 8. The cylindrical portion 82 further has a communication hole 92 open in its upper surface and communicating with one of the opposite ends of the part-circumferential groove 90, as shown in FIGS. 6–8, and a communication hole 94 open in its inner circumferential surface and communicating with the other end of the part-circumferential groove 90, as shown in FIGS. 7 and 8. As shown in FIG. 8, the cylindrical portion 82 further has an air passage 96 formed in a circumferential portion thereof in which the part-circumferential groove 90 is not formed. This air passage 96 is open at its inner end in the bottom wall of the central recess 88 of the engagement protrusion 84, and at the other or outer end in the outer circumferential surface of the cylindrical portion 82. A port 98 is formed in the cylindrical portion 82, in communication with the outer end of the air passage 96, so that a suitable air conduit or pipe is connected to the air passage 96 through the port 98.

The lower member 46 may be preferably formed of a synthetic resin material, by injection molding, for example. The resin material may be selected depending upon the desired strength and resistance to the non-compressible fluid or oil, and other factors. The air passage 96 and the port 98 may be formed after the lower member 46 is molded.

The lower member 46 is disposed below the intermediate assembly 43 such that the engagement protrusion 84 of the lower member 46 is fixedly fitted in the lower end portion of the engaging portion 54 of the support member 42, via the sealing rubber layer 60 interposed therebetween, with the annular inwardly bent edge 56 of the support member 42 engaging the annular engaging groove 86 of the lower member 46. The outer circumferential surface of the lower member 46 thus positioned within the second mounting member 12 is held in fluid-tight contact with the sealing rubber layer 32 formed on the inner circumferential surface of the lower small-diameter cylindrical portion 28 of the second mounting member 12. The small-diameter cylindrical portion 28 has an access hole 100 formed through its wall, at a circumferential position aligned with the port 98 of the lower member 46. The air conduit or pipe indicated above is connected to the port 98 through this access hole 100.

With the lower member 46 thus assembled with respect to the intermediate assembly 43 and the second mounting member 12, the lower open end of the cylindrical engaging portion 54 of the support member 42 is closed by the engaging protrusion 84 of the lower member 46, so that the movable rubber plate 40 and the engagement protrusion 84 (central recess 88) cooperate with each other to define an air chamber 102 which is isolated from the fluid chamber 36. With the lower member 46 assembled with respect to the support member 42, the outer circumferential surface of the support member 42 and the upper surface of the lower member 46 cooperate to define a circumferential groove 103 outside the engaging portion 54. This circumferential groove 103 and the part-circumferential groove 90 indicated above are both closed by the lower small-diameter cylindrical portion 28 of the second mounting member 12, and these two grooves 103, 90 are held in communication with each other through the communication hole 92, whereby an orifice passage 104 is formed. That is, the orifice passage 104 consists of two axial portions provided by the respective circumferential and part-circumferential grooves 103, 90 closed by the small-diameter cylindrical portion 28. The two axial portions communicate with each other through the communication hole 92. The orifice passage 104 communicates at its one end with the second primary fluid chamber 76 through the second communication passage 106 formed through the second aperture portion 72 of the upper member 44, and at the other end with the equilibrium fluid chamber 39 through the communication hole 94. Thus, the second primary fluid chamber 76 is held in communication with the equilibrium fluid chamber 39 through the orifice passage 104, so as to permit flows of the non-compressible fluid between the two chambers 76, 39. It is also noted that the orifice passage 104 communicates with the connecting channel 78 through the second primary fluid chamber 76, so that these orifice passage 104, connecting channel 78 and second primary fluid chamber 76 connected in series with each other cooperate to define a fluid passage for fluid communication between the first primary fluid chamber 37 and the equilibrium fluid chamber 39.

After the present engine mount is installed on the vehicle, the air conduit or pipe is connected to the port 98 of the air passage 96, so that the air pressure in the air chamber 102 is changed as needed. Described in detail, the air conduit is provided with a suitable switch valve having a first position for connecting the air chamber 102 (air passage 96) to an external vacuum source, and a second position for connecting the air chamber 102 (air passage 96) to the atmosphere. The switch valve is selectively placed in the first and second positions, under the control of a suitable control device, depending upon the type of the vibrational load to be damped by the engine mount.

Upon application of an engine shake or other low-frequency vibration to the engine mount, for example, the elastic body 14 is elastically deformed by the vibration, so that a pressure of the non-compressible fluid in the first primary fluid chamber 37 is periodically changed, whereby the fluid is forced to flow between the first primary fluid chamber 37 and the equilibrium fluid chamber 39 through the fluid passage consisting of the orifice passage 104, connecting channel 78 and second primary fluid chamber 76. Based on the resonance of the fluid, the engine mount exhibits a damping effect with respect to the low-frequency vibration. To obtain the desired damping effect with respect to the low-frequency vibration, the length and cross sectional area of fluid communication of the fluid passage (104, 78, 76) are desirably determined or tuned so that the resonance frequency of the non-compressible fluid flowing through that fluid passage corresponds to the frequency band of the low-frequency vibration to be damped. To assure a sufficiently large amount of flow of the fluid through the fluid passage, it is desirable to restrict the elastic deformation or displacement of the movable rubber plate 40 during application of the low-frequency vibration. To this end, a reduced pressure is applied to the air chamber 102 with the above-indicated switch valve placed in the first position, so that the movable rubber plate 40 is held at its fully lowered position on the side of the lower member 46, under the reduced pressure in the air chamber 102.

When the frequency of the input vibration is higher than the frequency of the low-frequency vibration to be effectively damped by the above-indicated fluid passage (consisting of the orifice passage 104, connecting channel 78 and second primary fluid chamber 76), for instance, when the input vibration is an engine idling vibration generated during idling of the vehicle engine, the resistance to flow of the fluid through that fluid passage is excessively large to damp the input vibration of such a comparatively high frequency. In this case, the above-indicated switch valve is alternately placed in the first and second positions at a frequency corresponding to the frequency of the comparatively high-frequency input vibration, to thereby periodically change the pressure in the air chamber 102 so as to oscillate the movable rubber plate 40 at the frequency corresponding to the frequency of the input vibration to be damped. Accordingly, the pressure in the second primary fluid chamber 76 is periodically changed, and the periodic change in the pressure in the second primary fluid chamber 76 is transmitted to the first primary fluid chamber 37 through the connecting channel 78, so that the pressure in the first primary fluid chamber 37 is controlled so as to effectively damp the engine idling or other high-frequency vibration. In this respect, it is desirable to tune the length and cross sectional area of communication of the connecting channel 78 so that the resonance frequency of the fluid flowing through the connecting channel 78 corresponds to the frequency of the high-frequency vibration to be damped.

In the present engine mount, the intermediate assembly 43, upper member 44 and lower member 46 are superposed on each other such that the intermediate assembly 43 is interposed between the upper and lower members 44, 46. Further, the cylindrical engaging portion 54 of the support member 42 of the intermediate assembly 43 is radially inwardly compressed or drawn onto the cylindrical engaging part 66 of the upper member 44 and the cylindrical engagement protrusion 84 of the lower member 46, via the sealing rubber layer 60, so as to establish fluid-tight sealing between the engaging part 66 and engaging protrusion 84 and the respective upper and lower end portions of the engaging portion 54. In addition, the flange portion 50 of the support member 42 and the flange portion 64 of the upper member 44 are superposed on each other and firmly held between the shoulder portion 24 of the second mounting member 12 and the metallic sleeve 20 fixed to the second mounting member 12, while the annular inwardly bent edge 56 of the support member 42 is held in engagement with the annular engaging groove 86 formed in the lower member 46. Accordingly, the upper and lower members 44, 46 are prevented from being moved relative to the support member 42 of the intermediate assembly 43, and the engaging part 66 of the upper member 44 and the engagement protrusion 84 of the lower member 46 are prevented from being removed from the engaging portion 54 of the support member 42.

Thus, the engaging portion 54 of the support member 42 which is drawn onto the engaging part 66 and the engagement protrusion 84 provides a simple structural arrangement for facilitating the assembling of the intermediate assembly 43 (support member 42) and the upper and lower members 44, 46 to form the partition structure 38, with excellent fluid-tight sealing at the interfaces of the components 42, 44, 46 of the partition structure 38. Since the drawing on the engaging portion 54 to establish the fluid-tight sealing is effected only after the engaging part 66 and the engagement protrusion 84 are fitted in the engaging portion 54, possible dimensional errors of those components can be advantageously accommodated during the drawing operation, assuring high stability of sealing at the interfaces of the components. In addition, the drawing force for establishing the fluid-tight sealing acts on the components 42, 44, 46 of the partition structure 38 in the radial direction. This arrangement assures high rigidity and durability of the partition structure 38 and a better sealing effect at the interfaces of the components, than the arrangement in which fluid-tight sealing is established by a force acting in the axial direction in which the components 42, 44, 46 are superposed on each other. The excellent sealing between the components of the partition structure 38 assures higher fluid tightness of the second primary fluid chamber 76, connecting channel 78 and air chamber 102, in particular, higher fluid tightness between the air chamber 102 and the fluid chamber 36, making it possible to maintain the desired damping effect for a prolonged period of time with high stability. Thus, the present engine mount has improved damping capability, durability and operational reliability.

It is also appreciated that the sealing rubber layer 60 is formed integrally with the movable rubber plate 40, leading to reduction in the number of the component members of the vibration damping device, and accordingly improved efficiency of assembling of the component members. Further, the drawing force applied to establish the fluid-tight sealing between the engaging portion 54 and the engaging part 66 and engagement protrusion 84 acts on the sealing rubber layer 60, but does not act directly on the movable rubber plate 40, whereby the adverse influences of the drawing force on the spring characteristics and the durability of the movable rubber plate 40 are minimized, to further improve the damping effect to be provided by the engine mount.

In addition, the partition structure 38 uses the metallic support and upper members 42, 44 which are formed by press forming operation. Thus, the partition structure 38 does not require the use of synthetic resin materials for all of its components, which requires fusion-welding or bonding of the components. Accordingly, the manufacturing efficiency is improved and the manufacturing cost is significantly lowered. Further, the lower member 46 having a relatively complicated structure having the air passage 96, engagement protrusion 84 and part-circumferential groove 90 can be formed of a synthetic resin material at a relatively low cost. Yet, the sealing between the support member 42 and the synthetic resin lower member 46 can be easily established by drawing the engaging portion 54 onto the engagement protrusion 84, namely, without any fusion bonding or welding. The synthetic resin of the lower member 46 can be effectively protected against cracking or other mechanical defect during the assembling operation of the partition structure 38, by suitably adjusting the configuration of the engagement protrusion 84 and the amount of drawing of the engaging portion 54 onto the engagement protrusion 84.

Further, the drawing of the engaging portion 54 of the support member 42 to establish the fluid tight sealing in the partition structure 38 permits a relatively large area of sealing with a relatively large sealing length in the axial direction of the engine mount, which assures a further improved sealing effect, while minimizing the required diameters of the partition structure 38 and the engine mount, making it possible to meet a requirement for reduction in the size of the engine mount.

Referring next to FIGS. 9–15, there will be described a vehicle engine mount constructed according to a second embodiment of this invention, which uses a partition structure 110 which is different from the partition structure 38 used in the engine mount of the first embodiment. The same reference signs as used in the first embodiment will be used in the second embodiment, to identify the same elements. Redundant description of these elements will not be provided.

Figure 10:
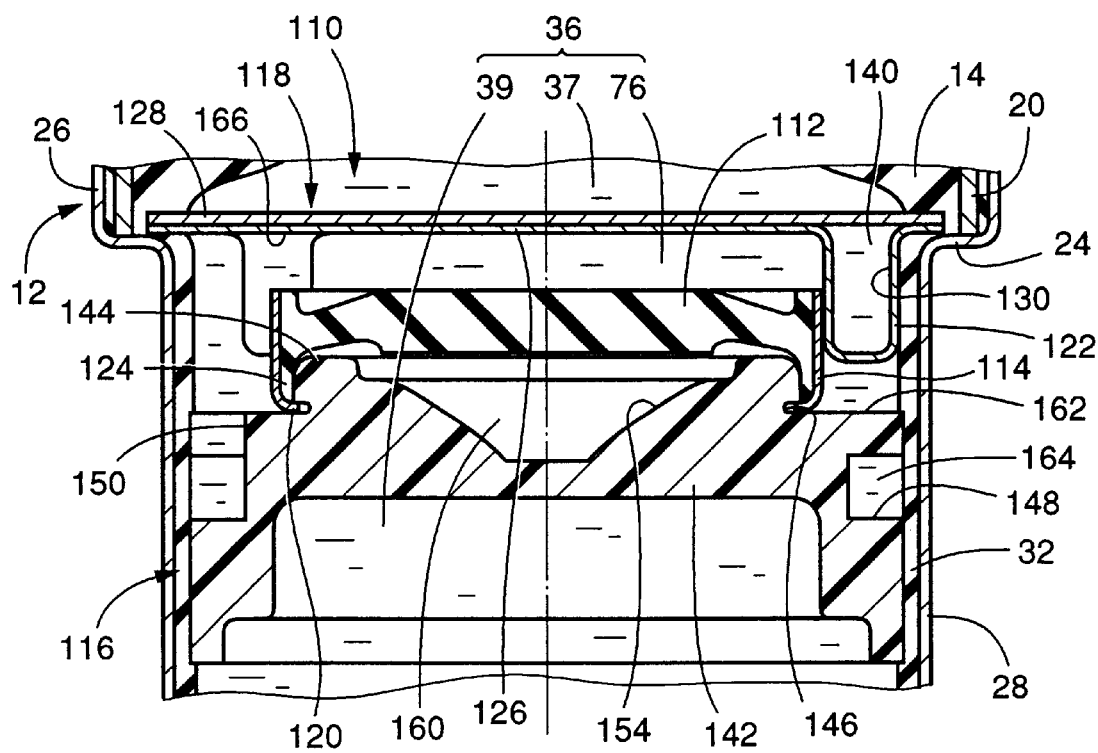
FIG. 10 is a fragmentary longitudinal cross sectional view of the engine mount of FIG. 9 taken along line 10—10 of FIGS. 12, 14 and 15.
Figure 11:
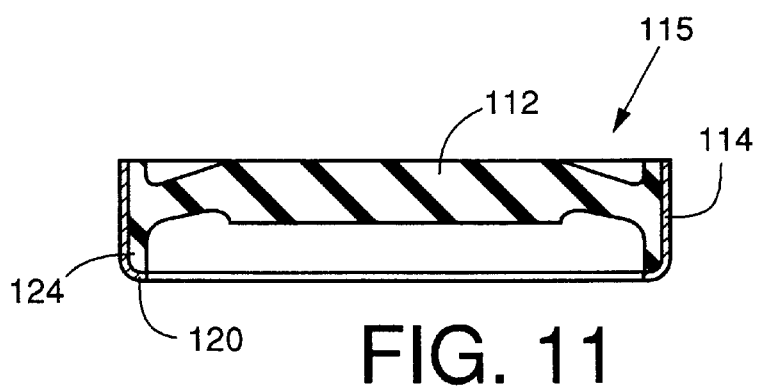
FIG. 11 is an elevational view in axial cross section of an intermediate assembly consisting of a support member of a partition structure provided in the engine mount of FIG. 9, and a movable rubber plate bonded to the support member.
Figure 12:
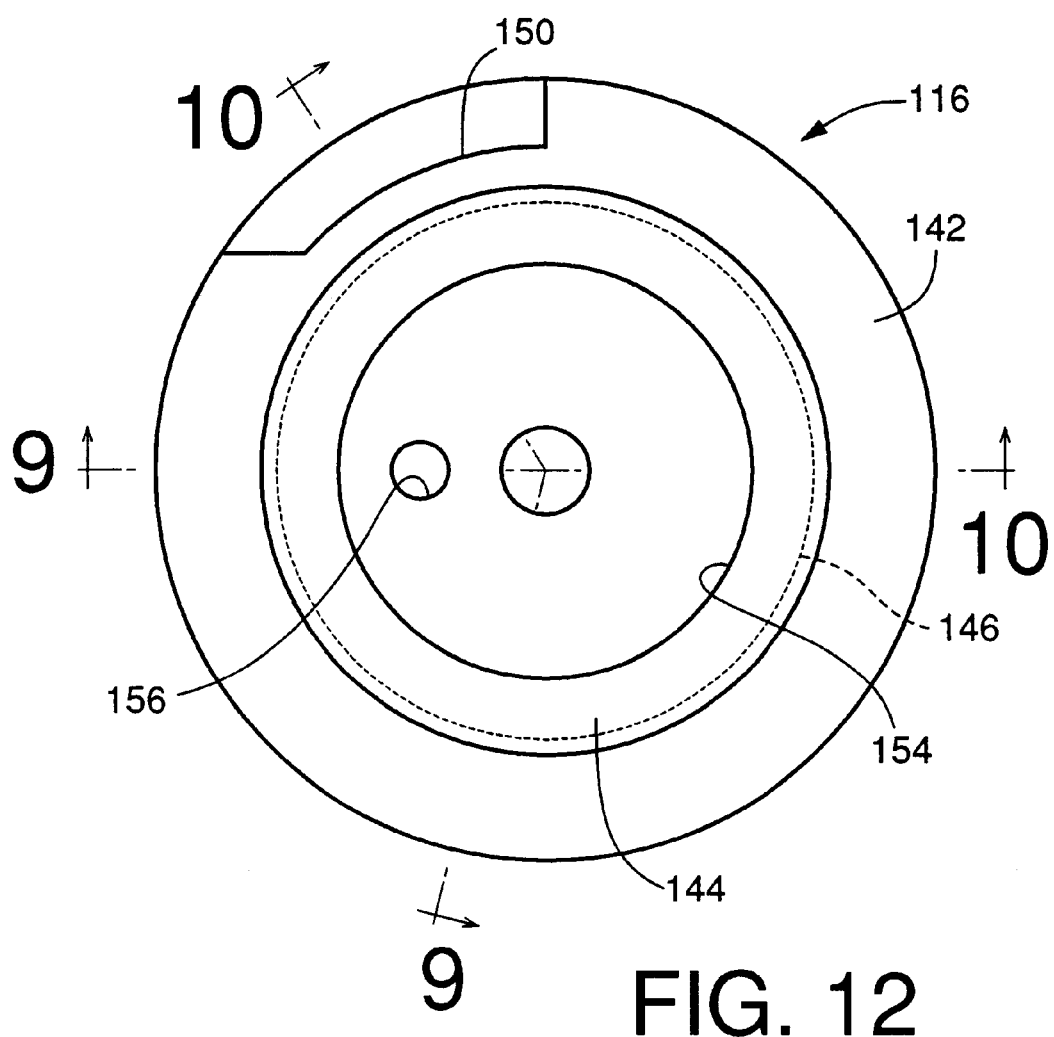
FIG. 12 is a plan view of a lower member of the partition structure of the engine mount of FIG. 9.
Figure 13:
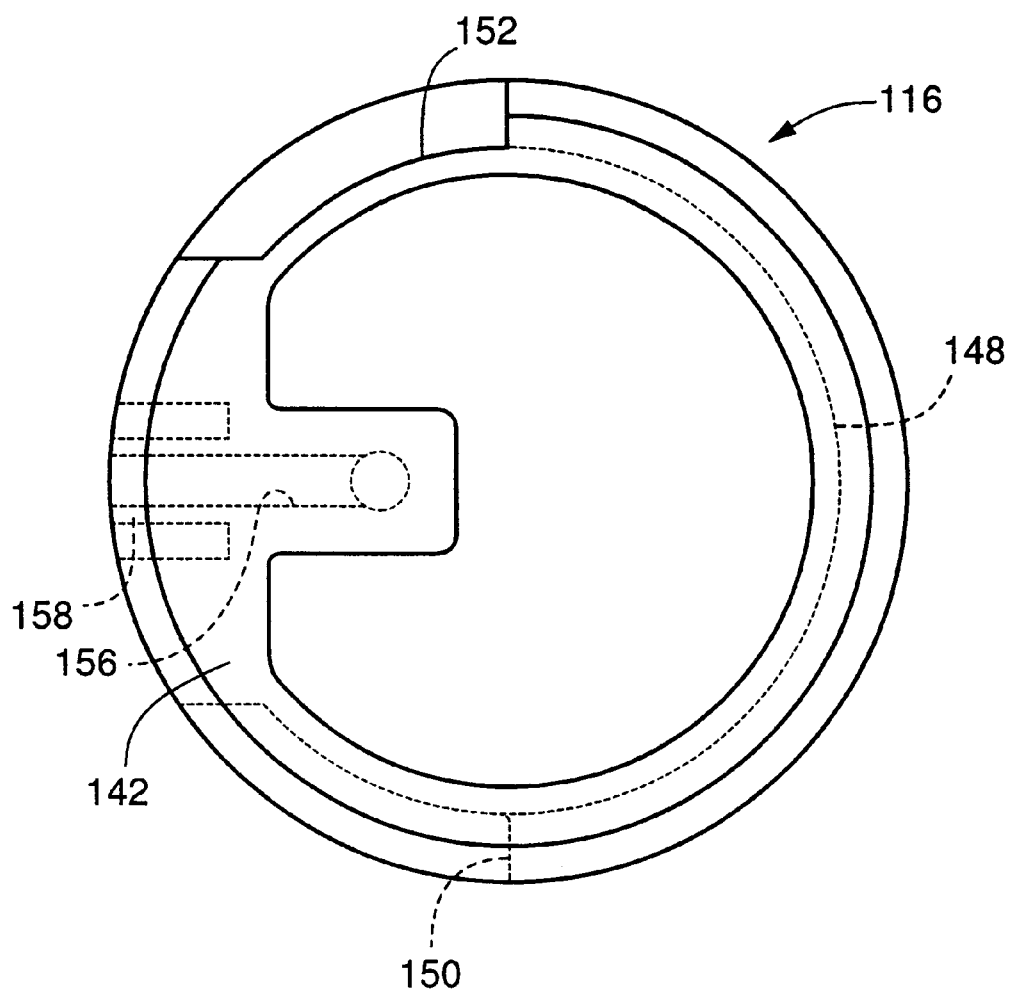
FIG. 13 is a bottom plan view of the lower member of FIG. 12.

The partition structure 110 used in the engine mount of this second embodiment is a generally circular block consisting of a metallic support member 114 shown in FIG. 11, a fluid-tightly fitted component in the form of a lower member 116 shown in FIGS. 12 and 13, and a press-fitted component in the form of an upper member 118 shown in FIG. 10. The support member 114 and a movable rubber plate 112 movably bonded to the support member 114 cooperate to constitute an intermediate assembly 115, as shown in FIG. 11. The intermediate assembly 115 and the lower and upper members 116, 118 are mutually fixed superposed on each other in the axial direction such that the intermediate assembly 115 is interposed between the lower and upper members 116, 118.

The support member 114 is a cylindrical member having inside and outside diameters which are substantially constant in the axial direction. The support member 114 has an integrally formed annular inwardly bent edge 120 at its lower end. The bent edge 120 extends radially inwardly over a small radial distance. As in the engine mount in the first embodiment, the movable rubber plate 112 having a generally circular disc shape is bonded at its periphery to the inner circumferential surface of the cylindrical support member 114, in the process of vulcanization of a rubber material to form the movable rubber plate 112. The inner circumferential surface of the support member 114 is substantially entirely covered by a thin sealing rubber layer 124.

Figure 9:
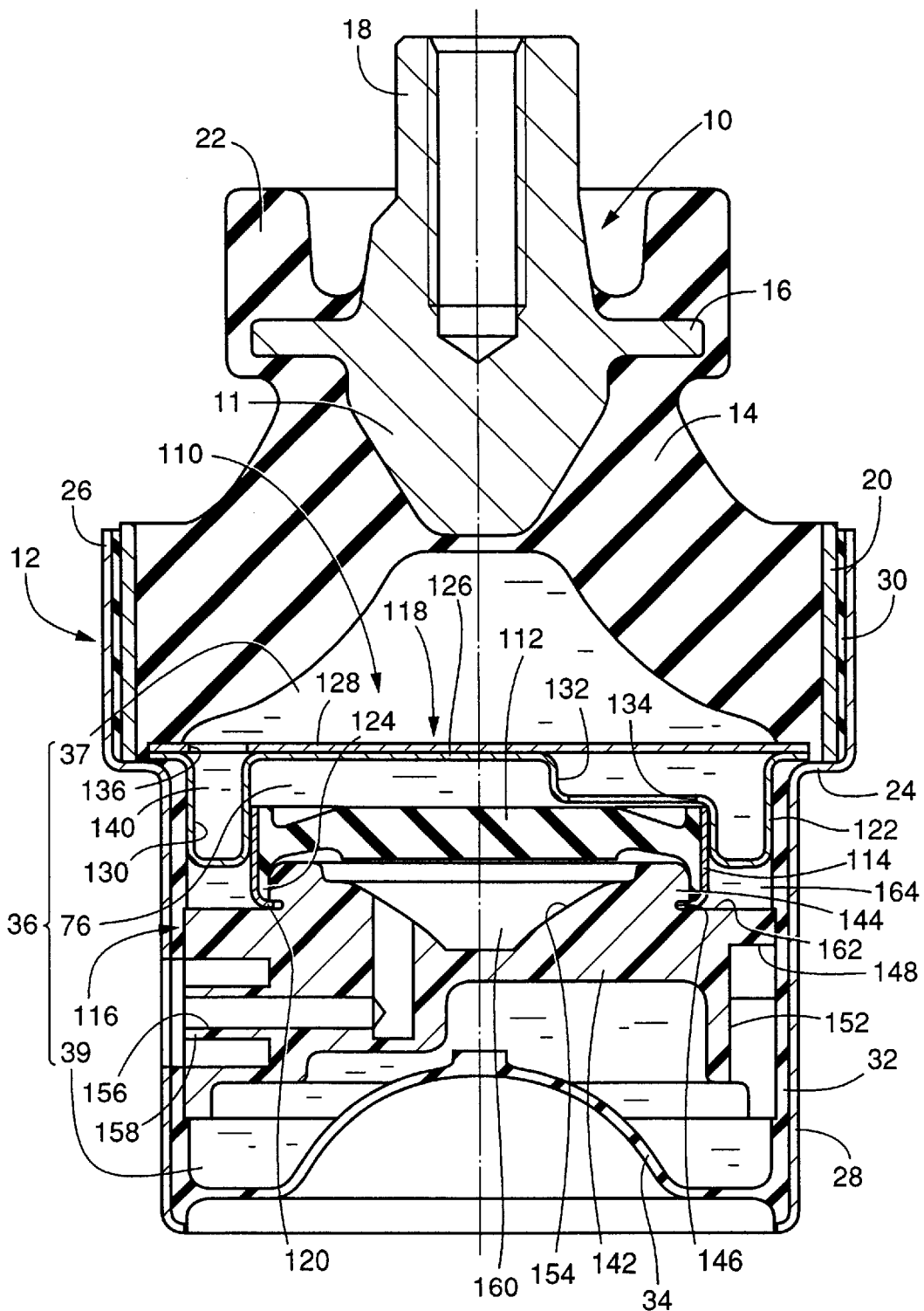
FIG. 9 is an elevational view in axial cross section of an automotive vehicle engine mount according to a second embodiment of this invention, the cross sectional view being taken along line 9—9 of FIGS. 12, 14 and 15.

The lower member 116 is an integral member formed of a synthetic resin material, which is generally similar in construction to the lower member 46 in the first embodiment. As shown in FIGS. 12 and 13, the lower member 116 includes a body portion 142 having a generally circular disc shape and a larger diameter than the support member 114. The lower member 116 further includes a cylindrical portion which extends downwards from the periphery of the body portion 142. The body portion 142 has an integrally formed circular central engagement protrusion 144 which is raised upwards away from the cylindrical portion. The central engagement protrusion 144 has an annular engaging groove 146 formed in its outer circumferential surface, and a frustoconical central recess 154 open in its upper surface, as shown in FIGS. 9 and 10. The body portion 142 further has a part-circumferential groove 148 formed in the outer circumferential surface, along about two-thirds of its entire circumference. The part-circumferential groove 148 is open at its one end in the upper surface of the body portion 142, through a first cutout 150, and at the other end in the lower surface through a second cutout 152. The body portion 142 further has an air passage 156 formed through a circumferential portion thereof in which the part-circumferential groove 148 is not formed. The air passage 156 extends in the radial direction of the lower member 116, as shown in FIG. 13. The air passage 156, which is formed by drilling, for example, is communicated at its one end with the central recess 154, and at the other end with a port 158 formed in the outer circumferential surface of the lower member 116.

The lower member 116 thus constructed is assembled with the intermediate assembly 115 such that the engagement protrusion 144 is fitted in the lower end portion of the support member 114 via the sealing rubber layer 124. In this condition, the support member 114 is radially inwardly compressed or drawn onto the outer circumferential surface of the engagement protrusion 144, via the sealing rubber layer 124, such that the annular inwardly bent edge 120 engages the engaging groove 146, whereby fluid tightness is established between the support member 114 and the lower member 116. It will be understood that the lower end portion of the support member 114 functions as a cylindrical engaging portion in which the engagement protrusion 144 of the lower member 116 is fitted. It is noted that the inside diameter of the bent edge 120 is slightly larger than the outside diameter of the engagement protrusion 144 before the radially inward compression of the support member 114, and is made smaller than the outside diameter of the engagement protrusion 144 when the engaging portion 120 is inserted in the engaging groove 146 due to the radially inward compression. As a result, the central recess 154 of the lower member 116 is fluid-tightly closed by the movable rubber plate 112, to provide an air chamber 160 which is partially defined by the movable rubber plate 112 and isolated from the fluid chamber 36.

Figure 14:
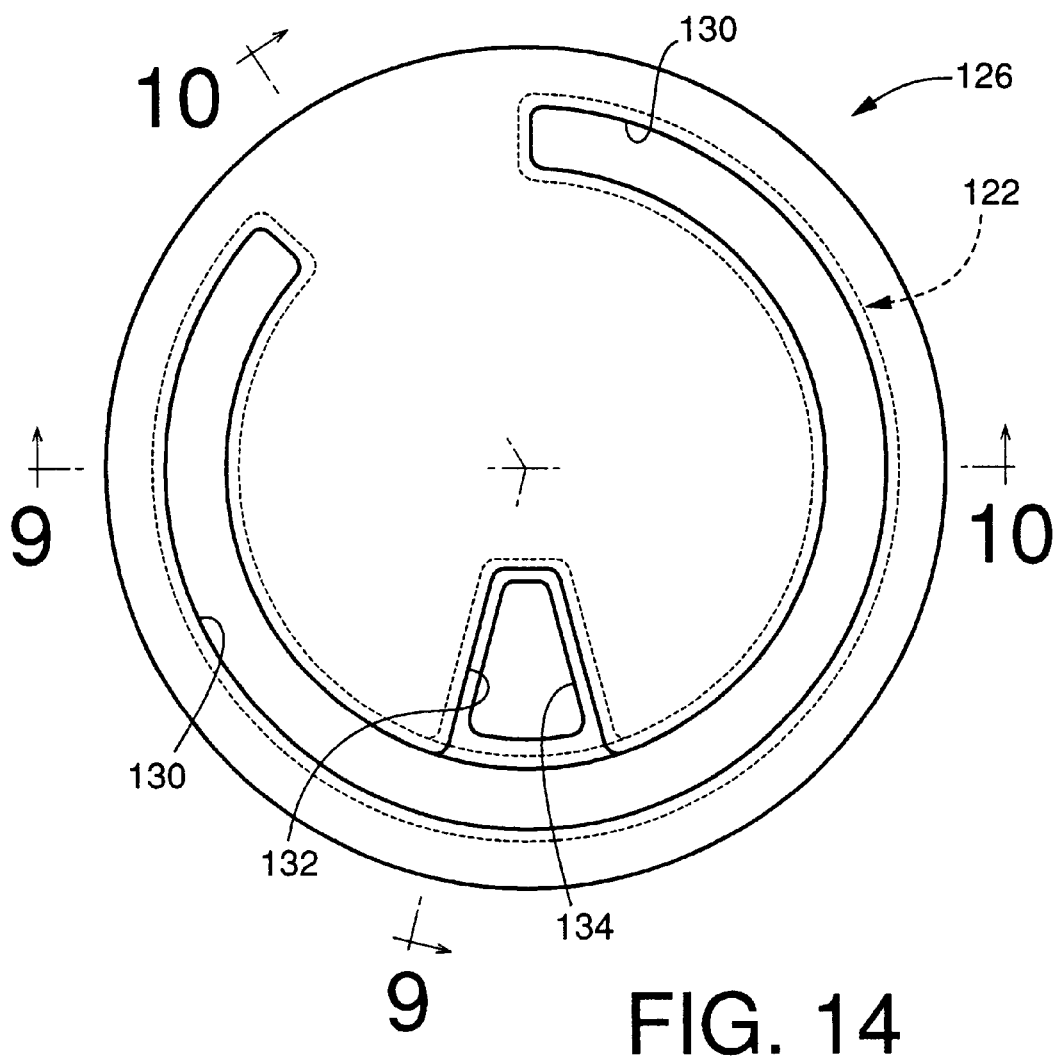
FIG. 14 is a plan view of a lower plate of an upper assembly of the partition structure of the engine mount of FIG. 9.
Figure 15:
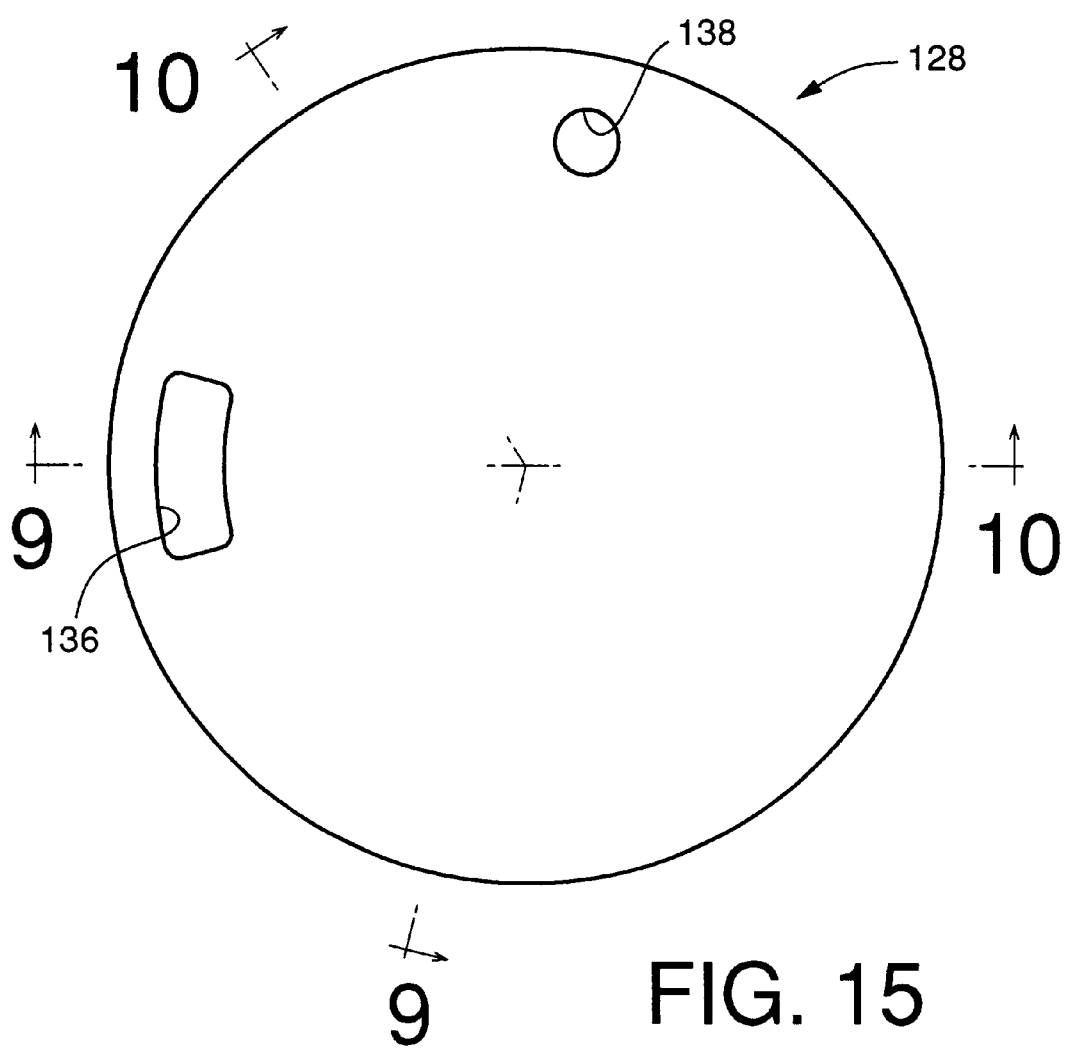
FIG. 15 is a plan view of an upper plate of the upper assembly of the partition structure of the engine mount of FIG. 9.

The upper member 118 consists of a lower plate 126 and an upper plate 128 which have a circular shape as shown in FIGS. 14 and 15 and a relatively large diameter and a relatively small thickness. These lower and upper plates 126, 128 are made of a metallic material and are superposed on each other. The lower plate 126 is formed by pressing from a thin circular metal plate, so as to have an engaging portion in the form of a part-circumferential hollow raised portion 122 which is raised on the side of its lower surface, as shown in FIGS. 9 and 14. This raised portion 122 extends along about seven-eighths of the entire circumference of the lower plate 126. The raised portion 122 has a part-circumferential groove 130 open in the upper surface of the lower plate 126. As shown in FIG. 14, the lower plate 126 also has a generally frustoconical raised portion 132 located radially inwardly of a circumferentially intermediate part of the part-circumferential groove 130. This raised portion 132 defines a recess whose depth is smaller than that of the groove 130 and whose bottom wall has a first communication passage 134 formed through a central part thereof, as shown in FIG. 14.

The upper plate 128 has substantially the same outside diameter as the lower plate 126, and two communication holes 136, 138 formed through respective radially outer parts thereof, as shown in FIG. 15. The communication holes 136, 138 are spaced apart from each other in the circumferential direction of the upper plate 128. The upper plate 128 is coaxially placed on the upper surface of the lower plate 126 and is fixed thereto by spot welding, for example. In the thus formed upper member 116, the part-circumferential groove 130 of the lower plate 126 is closed by the upper plate 128, so as to provide a connecting channel 140 which extends in the circumferential direction of the upper member 116. This connecting channel 140 is communicated at its opposite ends with the respective communication holes 136, 138, and at its intermediate part with the first communication passage 134.

The upper member 118 is placed on the intermediate assembly 115 which has been fixed to the lower member 116. That is, the part-circumferential raised portion 122 of the lower plate 128 is press-fitted on the outer circumferential surface of the upper portion of the support member 114. Thus, the upper member 118 is fixed to the intermediate assembly 115. It will be understood that the part-circumferential raised portion 122 functions as a substantially annular engaging portion of the upper member 118 which engages the support member 114. The inside diameter of the part-circumferential raised portion 122 of the upper member 118 is substantially equal to or slightly smaller than the outside diameter of the support member 114 before fixing of the upper member 118 to the intermediate assembly 115, so that the raised portion 122 is firmly press-fitted on the upper end portion of the support member 114. Further, the bottom wall of the part-circumferential groove 130 of the raised portion 122 is opposed to the upper surface of the body portion 142 of the lower member 116 in the axial direction of the cylindrical support member 114, with a suitable axial spacing therebetween, so that the bottom wall of the groove 130 of the raised portion 122 and the upper surface of a peripheral part of the body portion 142 cooperate with the outer circumferential surface of the support member 114 to define a part-circumferential groove 162.

The partition structure 110 consisting of the intermediate assembly 115, lower member 116 and upper member 118 which are assembled together as described above is fixed to the second mounting member 12 such that the upper member 118 is gripped at its peripheral portion by and between the shoulder portion 24 of the second mounting member 12 and the end face of the elastic body 14. In this condition, the upper member 118 separates the first primary fluid chamber 37 partially defined by the elastic body 14, and the second primary fluid chamber 76 partially defined by the movable rubber plate 112.

In the engine mount constructed as described above according to the second embodiment of this invention, the connecting passage 140 communicates at its circumferential opposite ends with the first primary fluid chamber 37 through the communication holes 136, 138, and at its circumferentially intermediate part with the second primary fluid chamber 76 through the first communication passage 134. Thus, the first and second primary fluid chambers 37, 76 are held in communication with each other through the connecting passage 140. The part-circumferential grooves 148, 162 open in the outer circumferential surface of the partition structure 110 are fluid-tightly closed by the lower small-diameter cylindrical portion 28 of the second mounting member 12, and are connected in series with each other through the first cutout 150. Thus, the grooves 148, 162 and the first cutout 150 cooperate with the inner circumferential surface of the cylindrical portion 28 to define an orifice passage 164 whose circumferential length is equal to or larger than a value corresponding to the outer circumference of the partition structure 110. This orifice passage 164 is communicated at its one end with the second primary fluid chamber 76 through a second communication passage 166, and at the other end with the equilibrium fluid chamber 39 through the second cutout 152. The second communication passage 166 is formed for fluid communication between the circumferential opposite ends of the part-circumferential groove 130 of the raised portion 122 of the upper member 118. Thus, the second primary fluid chamber 76 and the equilibrium fluid chamber 39 are held in fluid communication with each other through the orifice passage 164, so as to permit flows of the non-compressible fluid therebetween through the orifice passage 164. It is also noted that the orifice passage 164 communicates with the connecting channel 140 through the second primary fluid chamber 76, so that these orifice passage 164, connecting channel 104 and second primary fluid chamber 76 connected in series with each other cooperate to define a fluid passage for fluid communication between the first primary fluid chamber 37 and the equilibrium chamber 39.

Like the engine mount of the first embodiment, the engine mount of the present embodiment is adapted to control the air pressure in the air chamber 160 through the air passage 156 and a suitable switch valve, so as to adjust the damping characteristics, depending upon the type of the input vibrational load.

In the present second embodiment, the support member 114 of the intermediate assembly 115 is radially inwardly drawn onto the engagement protrusion 144 of the lower member 116, so as to assure fluid tightness of the air chamber 160. Unlike the support member 42 used in the first embodiment, the support member 114 has an outside diameter which is substantially constant in the axial direction. This constant diameter permits easy positioning of a drawing device used to radially inwardly compress the support member 114 against the engagement protrusion 144 of the lower member 116, leading to improved efficiency of assembling of the partition structure 110.

Further, the part-circumferential raised portion 122 of the upper member 118 can be press-fitted on the upper portion of the support member 114, with high efficiency, after the support member 114 has been fixed at its lower portion to the engaging protrusion 144 of the lower member 116. Accordingly, the overall assembling efficiency of the partition structure 110 is improved over that of the partition structure 38 of the first embodiment.

While the presently preferred embodiments of this invention have been described in detail for illustrative purpose only, it is to be understood that the present invention is not limited to the details of the illustrated embodiments, but may be embodied with various changes, modifications and improvements.

For instance, the air chamber 102, 160 need not be connected to an external pressure control device (e.g., a vacuum source and a switching valve) through the air passage 96, 156 for providing an active vibration damping effect based on oscillation of the movable rubber plate 40, 112 by a periodic change in the pressure in the air chamber 102, 160. Namely, the air chamber 102, 160 may be a completely enclosed space isolated from the atmosphere and any pressure control device, without the provision of the air passage 156. In this case, the engine mount does not provide the active vibration damping effect, but is capable of damping a high-frequency vibration owing to resonance or pressure absorbing effect of the fluid flowing through the connecting passage 78, 140, based on elastic deformation or displacement of the movable rubber plate 40, 112 caused by the high-frequency vibration.

The engine mount of the first embodiment may be modified such that the partition structure 38 consists of only the intermediate assembly 43 and the lower member 46, with the upper member 44 being removed. In this case, the engine mount has a single primary fluid chamber partially defined by the elastic body 14 and the movable rubber plate 40. In this case, too, the high-frequency vibration may be actively damped by positively oscillating the movable rubber plate 40 (by periodically changing the air pressure in the air chamber 102) to directly cause a periodic fluid pressure change in the primary fluid chamber, or passively damped by the elastic deformation or displacement of the movable rubber plate 40 which absorbs the fluid pressure change in the primary fluid chamber.

The engine mount of the first embodiment may also be modified such that the engaging portion 54 of the support member 42 is radially inwardly drawn onto only one of the upper and lower members 44, 46 (only the engaging part 66 or the engagement protrusion 84) so as to establish fluid tight sealing therebetween, rather than onto both of the upper and lower members 44, 46. In this case, fluid tight sealing between the engaging portion 54 and the other of the upper and lower members 44, 46 is established by the conventional means, for example, by application of a force therebetween in the axial direction in which the intermediate assembly 43 and the upper and lower members 44, 46 are superposed on each other. Further, the partition member 38 may employ an upper fluid-tightly fitted component made of a synthetic resin material rather than the metallic upper member 44, and a lower fluid-tightly fitted component made of a metallic material rather than the synthetic resin lower member 46.

It will also be understood that the configurations of the connecting channels 78, 140 and the orifice passages 104, 164 may be determined as needed depending upon the desired vibration characteristics.

The engine mount of the second embodiment may be modified such that the upper part of the support portion of the support member is radially inwardly drawn onto an engagement portion of an upper fluid-tightly fitted component disposed on the upper side of the support member, while an engagement portion of the press-fitted component disposed on the lower side of the support member is press-fitted in the lower portion of the support member.

While the presently preferred embodiments of the fluid-filled vibration damping device of the present invention in the form of the engine mount for automotive vehicles have been described above, the principle of this invention is equally applicable to other types of fluid-filled vibration damping device, such as body mounts for automotive vehicles, and fluid-filled dampers for various machines and other equipment other than automotive vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled vibration damping device including (a) a first mounting member and a second mounting member which are spaced apart from each other, (b) an elastic body elastically connecting said first and second mounting members and partially defining a primary fluid chamber filled with a non-compressible fluid, (c) a partition structure supported by said second mounting member and partially defining an orifice passage, (d) a flexible diaphragm partially defining an auxiliary fluid chamber which is filled with the non-compressible fluid, held in fluid communication with said primary fluid chamber through said orifice passage, and located on one of opposite sides of said partition structure which is remote from said primary fluid chamber, and (e) a movable rubber plate partially defining said primary fluid chamber and held at a peripheral portion thereof by said partition structure, wherein an improvement comprises:

said partition structure comprising a support member which includes a cylindrical engaging portion, and at least one fluid-tightly fitted component which is superposed on said support member in an axial direction of said cylindrical engaging portion and which includes a cylindrical engagement portion fitted in said cylindrical engaging portion of said support member;

said movable rubber plate being movably bonded at the peripheral portion thereof to an inner circumferential surface of said cylindrical engaging portion of said support member, which surface is covered by a sealing rubber layer; and said cylindrical engaging portion of said support member being radially inwardly drawn onto an outer circumferential surface of said cylindrical engagement portion of each of said at least one fluid-tightly fitted component via said sealing rubber layer, so as to establish fluid-tight sealing between said engaging portion of said support member and said each fluid-tightly fitted component.

2. A fluid-filled vibration damping device according to claim 1, wherein said at least one fluid-tightly fitted component includes a first fluid-tightly fitted component which is superposed on said support member, such that said first fluid-tightly fitted component is disposed on the same side of said support member as said primary fluid chamber, and such that said first fluid-tightly fitted component divides said primary fluid chamber into a first primary fluid chamber which is partially defined by said elastic body and which is located on one of opposite sides of said first fluid-tightly fitted component, and a second primary fluid chamber which is partially defined by said movable rubber plate and which is located on the other side of said first fluid-tightly fitted component, said first fluid-tightly fitted component and said support member having surfaces cooperating to define a connecting channel extending in a circumferential direction of said cylindrical engaging portion, said first and second primary fluid chambers communicating with each other through said connecting channel.

3. A fluid-filled vibration damping device according to claim 1, wherein said at least one fluid-tightly fitted component includes a second fluid-tightly fitted component which is superposed on said support member, such that said second fluid-tightly fitted component is disposed on the same side of said support member as said auxiliary fluid chamber, and such that said second fluid-tightly fitted component cooperates with said movable rubber plate to define an air chamber which permits elastic displacement of said movable rubber plate.

4. A fluid-filled vibration damping device according to claim 3, wherein said second fluid-tightly fitted component is formed of a synthetic resin material, and has an air passage communicating with an external air pressure source.

5. A fluid-filled vibration damping device according to claim 1, wherein said second mounting member includes a cylindrical portion in which said partition structure is accommodated, said support member and said at least one fluid-tightly fitted component cooperating with said cylindrical portion of said second mounting member to define said orifice passage such that said orifice passage extends in a circumferential direction of said cylindrical portion of said second mounting member and is at least partially defined by an outer circumferential surface of said support member.

6. A fluid-filled vibration damping device according to claim 1, wherein said at least one fluid-tightly fitted component consists of a single fluid-tightly fitted component, and said support member is a cylindrical member having axially opposite end portions one of which serves as said cylindrical engaging portion of said support member and which is radially inwardly drawn onto said cylindrical engagement portion of said single fluid-tightly fitted component, said support member having a constant outside diameter not larger than that of said cylindrical engagement portion of said single fluid-tightly fitted component, and wherein said partition structure further comprises a press-fitted component which includes a substantially annular engaging portion, said press-fitted component being superposed on said support member such that said support member is interposed between said press-fitted component and said single fluid-tightly fitted component and such that said substantially annular engaging portion is press-fitted on an outer circumferential surface of the other of said axially opposite end portions of said support member.

7. A fluid-filled vibration damping device according to claim 6, wherein said press-fitted component includes an annular peripheral portion at which said press-fitted component is fixed to said second mounting member.

8. A fluid-filled vibration damping device according to claim 6, wherein said press-fitted component includes a central portion which is spaced apart from said movable rubber plate in an axial direction of said support member, said press-fitted component being disposed on the same side of said support member as said primary fluid chamber, such that said press-fitted component divides said primary fluid chamber into a first primary fluid chamber partially defined by said elastic body and which is located on one of opposite sides of said central portion, and a second primary fluid chamber which is partially defined by said movable rubber plate and which is located on the other side of said central portion, said substantially annular engaging portion of said press-fitted component at least partially defining a connecting channel extending in a circumferential direction of said support member, said first and second primary fluid chambers communicating with each other through said connecting channel.

9. A fluid-filled vibration damping device according to claim 6, wherein said single fluid-tightly fitted component includes a body portion including said cylindrical engagement portion fitted in said one of axially opposite end portions of said support member, said body portion having a diameter larger than said constant outside diameter of said support member, said body portion further including a peripheral portion which cooperates with the outer circumferential surface of said support member and said substantially annular engaging portion of said press-fitted component to define a groove extending in a circumferential direction of said support member, said second mounting member including a cylindrical portion in which said partition structure is accommodated and which closes said groove to at least partially define said orifice passage.

10. A fluid-filled vibration damping device according to claim 1, wherein said at least one fluid-tightly fitted component includes a synthetic resin component formed of a synthetic resin material and including said cylindrical engagement portion which is fitted in said cylindrical engaging portion of said support member.

11. A fluid-filled vibration damping device according to claim 10, wherein said cylindrical engagement portion of said synthetic resin component includes an annular engaging groove, and wherein said cylindrical engaging portion of said support member is a cylindrical member having a radially inwardly bent edge formed at one of opposite axial ends thereof, said bent edge engaging said annular engaging groove when said cylindrical engaging portion of said support member is radially inwardly drawn onto said cylindrical engagement portion of said synthetic resin component.

12. A fluid-filled vibration damping device according to claim 1, wherein said sealing rubber layer is formed integrally with said movable rubber plate, said movable rubber plate having a central portion and a peripheral portion which has a smaller thickness than said central portion and at which said movable rubber plate is connected to said sealing rubber layer.

13. A fluid-tight vibration damping device according to claim 1, wherein said support member is formed of a metallic material, and said at least one fluid-tightly fitted component includes a resin member formed of a synthetic resin and disposed on one of opposite sides of said movable rubber plate which is remote from said primary fluid chamber.

14. A fluid-tight vibration damping device according to claim 13, wherein said resin member cooperates with said movable rubber plate to define an air chamber, and has an air passage communicating with said air chamber and an external air pressure source.

15. A fluid-tight vibration damping device according to claim 13, wherein said resin member is a lower member disposed generally below said support member.

16. A fluid-tight vibration damping device according to claim 1, wherein said support member is formed of a metallic material, and said at least one fluid-tightly fitted component includes a metallic member disposed on one of opposite sides of said movable rubber plate which is remote from said auxiliary fluid chamber, and a resin member disposed on the other side of said movable rubber plate.

17. A fluid-tight vibration damping device according to claim 16, wherein said resin member cooperates with said movable rubber plate to define an air chamber, and has an air passage communicating with said air chamber and an external air pressure source.

18. A fluid-tight vibration damping device according to claim 1, wherein said partition structure further comprises a press-fitted component which includes a substantially annular engaging portion and which is disposed on one of opposite sides of said movable rubber plate which is remote from said auxiliary fluid chamber such that said annular engaging portion is press-fitted on an outer circumferential surface of said support member, and said support member is formed of a metallic material, said at least one fluid-tightly fitted component includes a resin member which is formed of a synthetic resin and which is disposed on the other side of said movable rubber plate.

19. A fluid-tight vibration damping device according to claim 18, wherein said resin member cooperates with said movable rubber plate to define an air chamber and has an air passage communicating with said air chamber and an external air pressure source.

20. A fluid-tight vibration damping device including (a) a first mounting member and a second mounting member which are spaced apart from each other, (b) an elastic body elastically connecting said first and second mounting members and partially defining a primary fluid chamber filled with a non-compressible fluid, (c) a partition structure supported by said second mounting member and partially defining an orifice passage, (d) a flexible diaphragm partially defining an auxiliary fluid chamber which is filled with the non-compressible fluid, held in fluid communication with said primary fluid chamber through said orifice passage, and located on one of opposite sides of said partition structure which is remote from said primary fluid chamber, and (e) a movable rubber plate partially defining said primary fluid chamber and held at a peripheral portion thereof by said partition structure, wherein an improvement comprises:

said partition structure comprising a support member which is formed of a metallic material and which includes a cylindrical engaging portion, and at least one fluid-tightly fitted component which is superposed on said support member in an axial direction of said cylindrical engaging portion and which includes a cylindrical engagement portion fitted in said cylindrical engaging portion of said support member;

said at least one fluid-tightly fitted component including a resin member which is formed of a synthetic resin and which is disposed on one of opposite sides of said support member which is remote from said primary fluid chamber, said resin member cooperating with said movable rubber plate to define an air chamber, said resin member having an air passage communicating with said air chamber and an external air pressure source;

said movable rubber plate being movably bonded at the peripheral portion thereof to an inner circumferential surface of said cylindrical engaging portion of said support member, which surface is covered by a sealing rubber layer; and said cylindrical engaging portion of said support member being radially inwardly drawn onto said cylindrical engagement portion of each of said at least one fluid-tightly fitted component via said sealing rubber layer, so as to establish fluid-tight sealing between said engaging portion of said support member and said each fluid-tightly fitted component.

* * * * *